(12) United States Patent
Yadaw et al.

(10) Patent No.: US 11,822,558 B2
(45) Date of Patent: Nov. 21, 2023

(54) EFFICIENT INDEX LOOKUP USING LANGUAGE-AGNOSTIC VECTORS AND CONTEXT VECTORS

(71) Applicant: Microsoft Technology Licensing, LLC, Redmond, WA (US)

(72) Inventors: Hariom Yadaw, Gorakhpur (IN); Sushil Kumar Chordia, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 17/465,875

(22) Filed: Sep. 3, 2021

(65) Prior Publication Data

US 2023/0119161 A1    Apr. 20, 2023

(51) Int. Cl.
| | |
|---|---|
| *G06F 16/2457* | (2019.01) |
| *G06F 16/22* | (2019.01) |
| *G06N 20/00* | (2019.01) |
| *G06F 16/9538* | (2019.01) |
| *G06F 40/30* | (2020.01) |

(52) U.S. Cl.
CPC .... *G06F 16/24575* (2019.01); *G06F 16/2237* (2019.01); *G06F 16/9538* (2019.01); *G06F 40/30* (2020.01); *G06N 20/00* (2019.01)

(58) Field of Classification Search
CPC ........... G06F 16/24575; G06F 16/2237; G06F 16/9538; G06F 40/30; G06N 20/00
See application file for complete search history.

(56) References Cited

U.S. PATENT DOCUMENTS

| | | | |
|---|---|---|---|
| 10,963,644 B2 | 3/2021 | Aghajanyan et al. | |
| 11,080,349 B1* | 8/2021 | Zhang | G06F 16/22 |
| 2018/0203849 A1* | 7/2018 | Geib | G06F 40/30 |

(Continued)

OTHER PUBLICATIONS

Malkov, et al., "Efficient and Robust Approximate Nearest Neighbor Search Using Hierarchical Navigable Small World Graphs," in IEEE Transactions on Pattern Analysis and Machine Intelligence, vol. 2, Issue 4, Apr. 2020, pp. 824-836.

(Continued)

*Primary Examiner* — Irete F Ehichioya
*Assistant Examiner* — Xiaoqin Hu

(57) ABSTRACT

Technology is described herein for searching an index, including operations of: obtaining a source data item; generating a source context-supplemented vector based on the source data item; and searching the index to find one or more target context-supplemented vectors that are determined to match the source context-supplemented vector. Each context-supplemented vector, which is associated with a particular data item, is made up of two parts: a language-agnostic vector and a context vector. The language-agnostic vector expresses the meaning of the particular data item in a manner that is independent of a natural language that is used to express the particular data item, while the context vector expresses a context associated with the formation of the particular data item. More generally, the technology's use of context vectors allows it to perform index search operations in a more efficient manner, compared to a search engine that does not use context vectors.

17 Claims, 9 Drawing Sheets

(56) References Cited

U.S. PATENT DOCUMENTS

| | | | |
|---|---|---|---|
| 2020/0210523 A1* | 7/2020 | Aghajanyan | G06N 3/044 |
| 2020/0410003 A1 | 12/2020 | Simhadri et al. | |
| 2021/0141798 A1 | 5/2021 | Steedman Henderson | |

OTHER PUBLICATIONS

Kudo, et al., "SentencePiece: A simple and language independent subword tokenizer and detokenizer for Neural Text Processing," in arXiv, Cornell University, arXiv:1808.06226v1 [cs.CL], Aug. 19, 2018, 6 pages.

Search Report and Written Opinion in PCT/US2022.037108, dated Sep. 2022, 16 pages.

Pennington, et al., "GloVe: Global Vectors for Word Representation," available at https://nlp.stanford.edu/projects/glove/, 2014, accessed on Jul. 27, 2021, 3 pages.

Pennington, et al., "GloVe: Global Vectors for Word Representation," in Proceedings of the 2014 Conference on Empirical Methods in Natural Language Processing (EMNLP), Oct. 2014, pp. 1532-1543.

Subramanya, et al., "DiskANN: Fast Accurate Billion-point Nearest Neighbor Search on a Single Node," in 33rd Conference on Neural Information Processing Systems (NeurIPS 2019), 2019, 11 pages.

Aghajanyan, et al., "Towards Language Agnostic Universal Representations," arXiv:1809.08510v1 [cs.CL], Sep. 23, 2018, 10 pages.

Tenney, et al., "BERT Rediscovers the Classical NLP Pipeline," arXiv:1905.05950v2 [cs.CL], Aug. 9, 2019, 9 pages.

Malkov, et al., "Efficient and Tobust Rpproximate Nearest Neighbor Search using Hierarchical Navigable Small World Graphs," arXiv:1603.09320 [cs.DS], Aug. 14, 2018, 13 pages.

Li, et al., "Approximate Nearest Neighbor Search on High Dimensional Data—Experiments, Analyses, and Improvement (v1.0)," arXiv:1610.02455v1 [cs.DB], Oct. 8, 2016, 26 pages.

Zhu, et al., "Deep Learning Vector Search Service," available at https://www.usenix.org/conference/opml19/presentation/zhu, 2019 USENIX Conference on Operational Machine Learning, May 20, 2019, accessed on Jul. 20, 2021, 8 pages.

Schwenk, et al., "Learning Joint Multilingual Sentence Representations with Neural Machine Translation," arXiv:1704.04154v2 [cs.CL], Aug. 8, 2017, 11 pages.

Conneau, et al., "Unsupervised Cross-lingual Representation Learning at Scale," arXiv:1911.02116v2 [cs.CL], Apr. 8, 2020, 12 pages.

Ruder, et al., "A Survey of Cross-lingual Word Embedding Models," arXiv:1706.04902v4 [cs.CL], Oct. 6, 2019, 62 pages.

Johnson, et al., "Billion-scale similarity search with GPUs," arXiv:1702.08734v1 [cs.CV], Feb. 28, 2017, 12 pages.

Mikolov, et al., "Efficient Estimation of Word Representations in Vector Space," arXiv:1301.3781v3 [cs.CL], Sep. 7, 2013, 12 pages.

Vaswani, et al., "Attention Is All You Need," arXiv:1706.03762v5 [cs.CL], Dec. 6, 2017, 15 pages.

\* cited by examiner

CONTINUED FROM FIG. 11

PROVIDE THE INFORMATION THAT IS RETRIEVED TO THE USER, EACH INDEX ENTRY IN THE INDEX BEING ASSOCIATED WITH A TARGET DATA ITEM, THE INDEX ENTRY HAVING A FIELD THAT INCLUDES A TARGET CONTEXT-SUPPLEMENTED VECTOR THAT IS MADE UP OF A TARGET LANGUAGE-AGNOSTIC VECTOR AND A TARGET CONTEXT VECTOR, THE TARGET LANGUAGE-AGNOSTIC VECTOR BEING GENERATED BY THE MACHINE-TRAINED MODEL AND EXPRESSING A SEMANTIC CONTENT OF THE TARGET DATA ITEM THAT IS INDEPENDENT OF A NATURAL LANGUAGE USED TO EXPRESS THE TARGET DATA ITEM, AND THE TARGET CONTEXT VECTOR EXPRESSING A TARGET CONTEXT ASSOCIATED WITH THE TARGET DATA ITEM THAT DEPENDS ON ONE OR MORE TARGET CONTEXT PARAMETERS, THE SEARCHING OPERATION IDENTIFYING THE AT LEAST ONE INDEX ENTRY BY COMPARING THE SOURCE CONTEXT-SUPPLEMENTED VECTOR WITH A PLURALITY OF TARGET CONTEXT-SUPPLEMENTED VECTORS IN THE INDEX, AND THE SEARCHING OPERATION IDENTIFYING THE AT LEAST ONE INDEX ENTRY WITH FEWER INDEX INTERROGATION OPERATIONS BY USING SOURCE AND TARGET CONTEXT VECTORS, COMPARED TO A SEARCH OPERATION THAT DOES NOT USE THE SOURCE AND TARGET CONTEXT VECTORS.
1202

FIG. 12

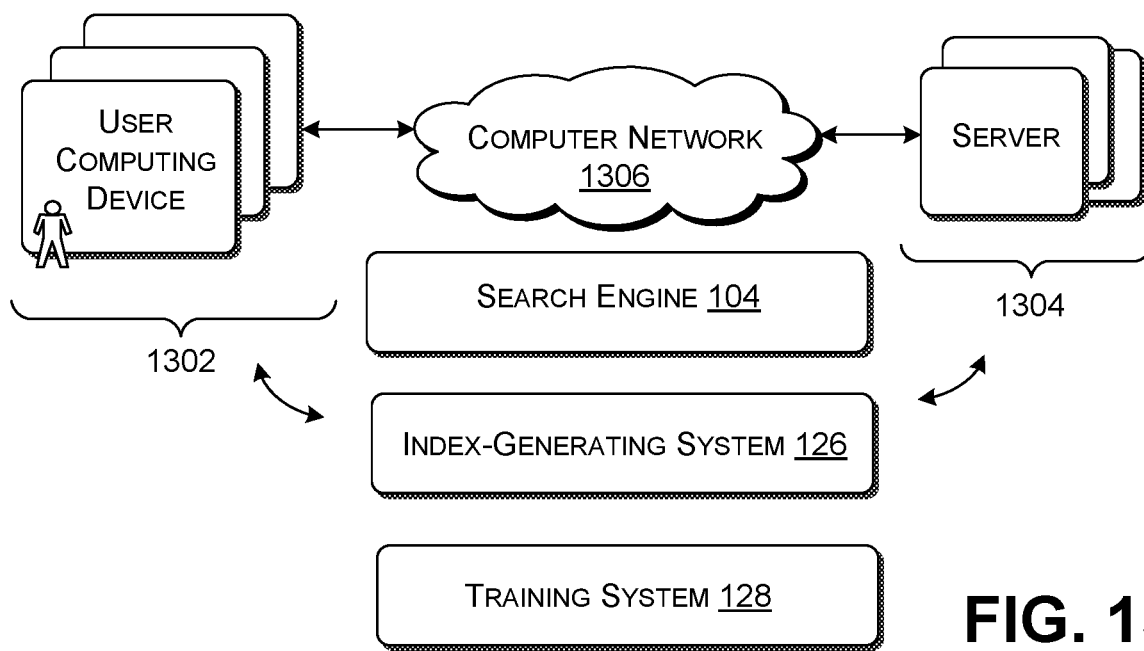

FIG. 13

EFFICIENT INDEX LOOKUP USING LANGUAGE-AGNOSTIC VECTORS AND CONTEXT VECTORS

BACKGROUND

Some search engines operate by converting a user's query into a distributed source vector that expresses the query's meaning. The search engine then searches an index to find one or more target vectors that best match the source vector. The search engine responds to the user's query by identifying the target data items (e.g., documents, etc.) which respectively correspond to the identified target vectors. While the use of distributed vectors may improve the quality of a search engine's output results, there remains technical inefficiencies in vector-based search technology.

SUMMARY

A computer-implemented technique is described herein for improving the efficiency in which a search engine performs a vector-based search operation. Some implementations of the technique involve: obtaining a source data item (e.g., a query); generating a source context-supplemented vector based on the source data item; and searching an index to find one or more target context-supplemented vectors that are determined to match the source context-supplemented vector. Each context-supplemented vector, which is associated with a particular data item, is made up of two parts: a language-agnostic vector and a context vector. The language-agnostic vector expresses the meaning of the particular data item in a manner that is independent of a natural language that is used to express the data item, while the context vector expresses a context associated with the formation of the particular data item. Overall, the technique's use of context vectors allows it to perform index search operations in a more resource-efficient and time-efficient manner, compared to a search engine that does not use context vectors. For instance, the technique's use of context vectors allows it to converge on appropriate target data items in a more direct manner, compared to a search engine that does not use context vectors.

According to some implementations, the source context vector depends on one or more source context parameters that describe aspects of the context in which the user submits the source data item. Without limitation, the source context parameters can include any of: a first source context parameter that describes the source natural language used to express the source data item; and/or a second source context parameter that describes a geographic region from which the user submits the source data item; and/or a third source context parameter that describes the behavior of the user in conducting one or more prior searches. A "language vector," as the term is used herein, refers to a particular kind of context vector that specifies at least the natural language used to describe a corresponding data item. The language vector can optionally also describe other aspects of the context associated with the data item. A "language-supplemented vector" refers to a particular kind of context-supplemented vector that is formed by combining a language vector and a language-agnostic vector.

According to some implementations, the technique obtains the source context vector by selecting it from a data store of pre-generated source context vectors. The pre-generated source context vectors can be manually chosen, and/or can be automatically derived in a machine-learning process. According to other implementations, the technique uses a machine-trained model to generate the source context vector at query time.

The technique solves a technical problem in which the source data item resolves (e.g., hashes) into a lookup key (e.g., the "source vector") that maps to plural target data items that are associated with the same lookup key, but wherein only some of those target data items are good matches for the source data item. In some cases, without the benefit of the technique described herein, a computing system would be required to repeatedly probe the index until it located a sufficient number of target data items that are actual good matches for the source data item. Alternatively, or in addition, the computing system would be required to probe the index to find a first set of candidate target data items, and then filter this set to identify a truly relevant smaller subset of target data items. These operations are inefficient because they add additional computational operations, and thus they waste time and computing resources. The technique solves this problem by adding a distinguishing offset (e.g., the source context vector) to the source lookup key, to produce a supplemented lookup key (e.g., a source context-supplemented vector) and adding distinguishing offsets to each existing key in the index (e.g., which produces a target context-supplemented vector). The technique can leverage the supplemented keys to more directly identify target data items that are good matches of the source data item, without incurring the kind of inefficiencies noted above. This improvement extends to different environments associated with different kinds of data items, and is not limited to the processing of linguistic data items.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 11 and 12 together form a flowchart that describes one manner of operation of the computing system of FIG. 1.

FIG. 13 shows computing equipment that can be used to implement the computing system shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for performing a vector-based search. Section B sets forth illustrative methods which explain the operation of the computing system of Section A. And Section C describes illustrative computing functionality that can be used to implement any aspect of the features described in Sections A and B.

A. Illustrative Computing System

Figure 1:
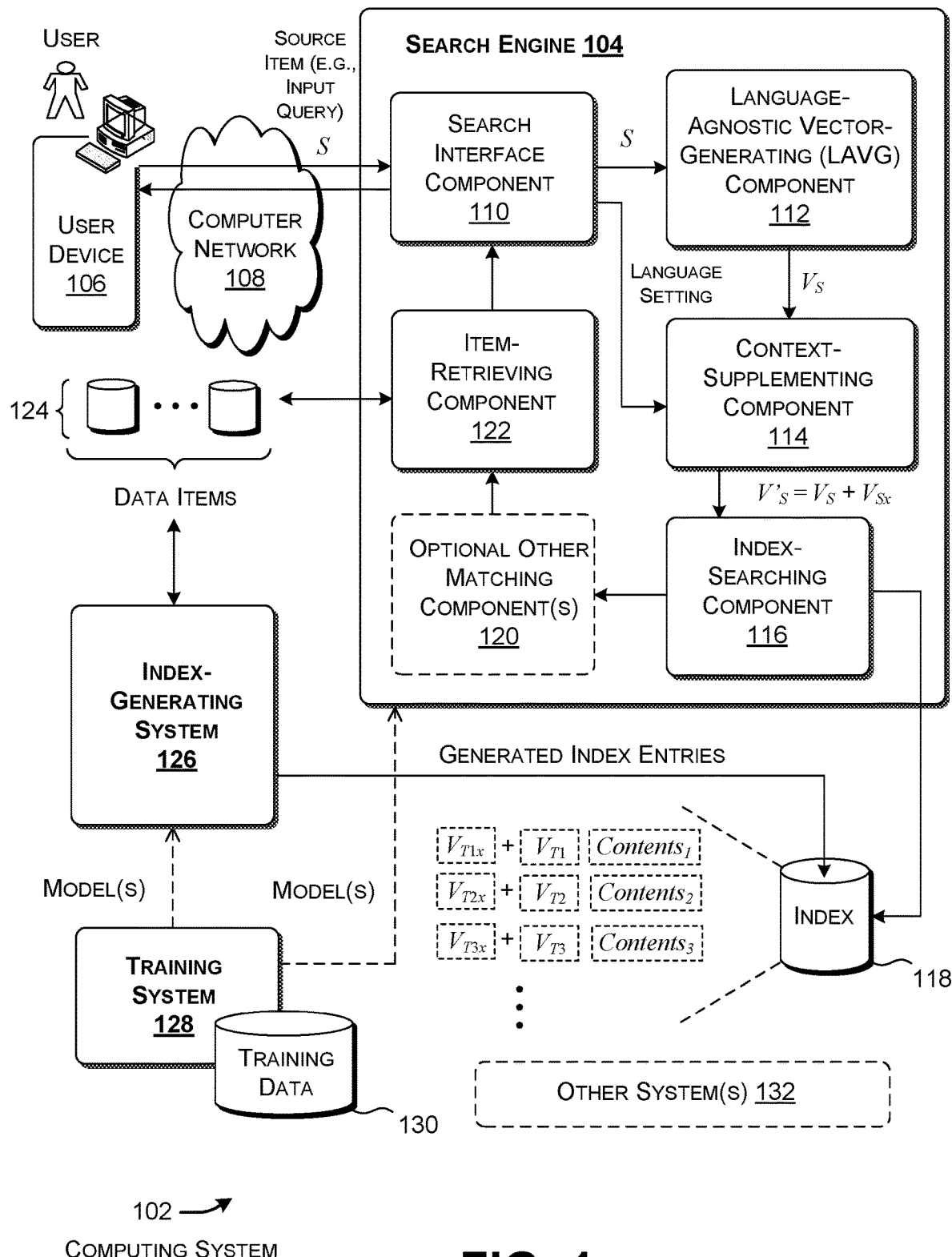
FIG. 1 shows an illustrative computing system for searching an index.

FIG. 1 shows a computing system 102 that enables a user to identify one or more target data items, given a specified source data item. According to the notation used herein, the source data item is represented by S, and each candidate target data item is represented by $T_i$, or more simply, T. The term "data item" has different interpretations in different implementations of the computing system 102. In some implementations, the source data item refers to a query submitted by a user. In these cases, a target data item may correspond to a suggested query that is related to the query submitted by the user, a content item (e.g., a document, advertisement, etc.) that matches the query, an answer that responds to the query, and so on. The term "query" also should be broadly construed to encompass any digital data, including a sequence of one or more words input by a user, a document identified by the user, etc. For example, other implementations can use the computing system 102 to identify one or more target documents that best match a source document that is identified by the user. To nevertheless simplify and facilitate the explanation, the following explanation will most often emphasize the case in which the source data item is a query having one or more tokens (e.g., words), and each candidate target data item corresponds to a query suggestion, answer, document, advertisement, etc.

In some implementations, each user interacts with a search engine 104 via a user computing device ("user device") 106. Without limitation, the user device 106 may correspond to a stationary personal computing device, a laptop computing device, a handheld computing device of any type (e.g., a smartphone, etc.), a game console, a wearable computing device, a mixed-reality device, and so on. In some implementations, the user device 106 interacts with the search engine 104 via a computer network 108, such as a wide area network (e.g., the Internet), a local area network, etc.

In some implementations, the search engine 104 includes a search interface component 110 for interacting with the user device 106. For instance, the search interface component 110 can provide one or more network-accessible pages with which the user may interact using a browser program installed on the user device 106. In some implementations, the search interface component 110 receives a source data item S (e.g., a query q) selected by the user through at least one network-accessible page. In response to the query, the search interface component 110 provides search results via at least one network-accessible page. Assume that the source data item S includes one or more terms and is expressed in a natural language, referred to herein as a "source natural language." For example, the source natural language can correspond to English, French, Chinese, etc.

The concept of a search engine 104 should be broadly construed. In other implementations, for instance, the search engine 104 is a component of a dialogue management system. Here, the search engine 104 may receive a question from a user in the course of an ongoing dialogue. The search engine 104 then formulates and delivers a reply to the question.

A language-agnostic vector-generating (LAVG) component 112 uses a machine-trained model to convert the input data item S into a source language-agnostic vector $V_S$, referred to herein as a "source language-agnostic vector." The source language-agnostic vector expresses, in distributed fashion, the semantic content of the source data item S across n dimensions of a vector space. The source language-agnostic vector is specifically said to be "language-agnostic" because it expresses the meaning of the source data item in a manner that is independent of the natural language used to express the source data item. This means that different source data items (e.g., different queries) that express the same semantic content will all map to the same source language-agnostic vector, with some system-specific degree of error. The machine-trained model that generates the query language-agnostic vector is referred to as a universal encoder component (UEC). One non-limiting implementation of the UEC is described below with reference to FIG. 10.

A context-supplementing component 114 produces a source context-supplemented vector $V_S'$. The context-supplementing component 114 generates this vector by first producing a source context vector $V_{S_x}$ that describes the context in which the user has provided the source data item. This context is referred to herein as the "source context." The source context, in turn, may exhibit one or more aspects that may be represented by one or more respective source context parameters. Without limitation, one source context parameter may describe the source natural language in which the source data item is expressed. For instance, this source context parameter may represent the natural language in which the user typed or voiced an input query.

Another source context parameter may describe the geographical region from which the user is presumed to have submitted the source data item. The geographical region can be specified with any environment-specific granularity. For instance, the geographical region can refer to a region of the world (e.g., the North America, Europe, the Far East, etc.), a particular country, a particular state or region within a country, a particular city, etc.

Another source context parameter may describe the prior behavior of the user in performing in searches. For instance, this source context parameter may identify the natural language that the user most often uses to submit queries and/or the natural language of target data items that the user most often selects in response to the queries. Alternatively, or in addition, this kind of source context parameter can be formulated as a distribution of the user's preferred natural languages.

The above parameters are identified here in the spirit of illustration, not limitation. Other implementations can introduce additional source context parameters and/or can omit any of the source context parameters described above. For example, other implementations can produce source context parameters that describe the organizational affiliation of the user, the contacts of the user, the specified likes and/or dislikes of the user, other characteristics of the user, etc.

The manner in which the LAVG component 112 generates source context vectors will be explained below in the context of the description of FIGS. 4 and 6. As a preview to that later description, the LAVG component 112 can select a source context vector that is appropriate to the identified source context from a data store of pre-generated context vectors. At least some of those pre-generated source context vectors can be manually specified. Alternatively, or in addition, at least some of the pre-generated source context vectors can be derived based on a machine-training process. In other implementations, the LAVG component 112 can use a machine-trained model to dynamically generate the source context vector at query time based on input information that describes the source context.

The context-supplementing component 114 then combines the source language-agnostic vector $V_S$ with the source context vector $V_{Sx}$, e.g., by concatenating these two vectors. The combination of the source language-agnostic vector $V_S$ and the source context vector $V_{Sx}$ yields a source context-supplemented vector $V_S'$, according to the terminology used herein. The vector $V_S'$ is said to be "context-supplemented" because it supplements the source language-agnostic vector $V_S$ with context information that describes the conditions in which the source data item S was submitted or otherwise formed.

An index-searching component 116 searches an index in a data store 118 to find one or more target data items that best match the source data item S. As noted above, what constitutes a target data item may differ in different implementations. For instance, a target data item may correspond to a query suggestion, a document, an answer, etc. In some implementations, the index includes a plurality of index entries arranged in a data structure. In some implementations, each index entry identifies a particular target data item T. The index entry has a field that includes target context-supplemented vector $V_T'$ that describes the target data item T, together with other contents. The target context-supplemented vector $V_T'$, in turn, is made up of a target language-agnostic vector $V_T$ combined with a target context vector $V_{Tx}$.

The target language-agnostic vector $V_T$ may be generated by the same machine-trained model (e.g., the UEC) that is used to generate the source language-agnostic vector $V_S$. It expresses the meaning of the target data item in a manner that is independent of language. The target context vector $V_{Tx}$ expresses the target context associated with the formation of the target data item T. Like the source context, the target context has plural aspects that may be represented by plural respective target context parameters. Without limitation, one target context parameter describes the natural language that is used to express the target context item. Another target context parameter expresses the region (or regions) associated with the target content item. For example, this kind of target context parameter may describe the region(s) from which the target data item originated, if known, or the most common region(s) of users who commonly interact with the target data item, etc. Another target context parameter specifies the search behavior of users who typically select or otherwise interact with the target data item.

The index-searching component 116 operates by finding at least one index entry having a target context-supplemented vector $V_T'$ that is determined to match the source context-supplemented vector $V_S'$. The degree to which two vectors match can be measured using any distance metric, such as cosine similarity, Manhattan distance, etc. As will be described in greater detail below in connection with FIGS. 2 and 3, the index-searching component 116 can use any approximate nearest neighbor (ANN) technique to efficiently compare the context-supplemented vector with the target context-supplemented vectors.

The search engine 104 can optionally include one or more other kinds of matching components 120. For instance, the other matching component(s) 120 can perform a feature-based search of the index. The other matching component(s) 120 perform this task by generating a set of source features that describe the source data item. For instance, the source features can describe the lexical and semantic characteristics of the source data item. An index entry for a target data item under consideration may have its own set of pre-generated target features that describe the target data item. A machine-trained model can map the source features and the target features into a score that describes an extent to which the target data item is relevant to the source data item. The search engine 104 can identify a final set of matching candidate items in any manner, e.g., by combining the respective results of the vector-based index-searching component 116 and the other matching component(s) 120. Although not shown, the search engine 104 can also employ one or more ranking components to rank the relevance of the data items that it has identified.

An item-retrieving component 122 retrieves information regarding the identified target data item(s) to present to the user. In some implementations, the item-retrieving component 122 can retrieve information relating to an identified target data item from the index itself. That is, the contents of the index entry for the target data item may include the information regarding the target data item that is supplied to the user. Alternatively, or in addition, the item-retrieving component 122 can retrieve information relating to an identified target data item from other data stores 124. In these cases, the item-retrieving component 122 uses a pointer that is part of the index entry of the target data item to identify a location in the data stores 124 at which the target data item may be found.

In some cases, the search interface component 110 can formulate an output result that specifies the information that has been retrieved. Without limitation, the output result may correspond to one or more query suggestions that are related to the user's input query, an answer to the user's input query, a set of snippets that summarize the matching target data items, the matching target data items themselves, etc.

An index-generating system 126 produces the index entries in the index. The operation of the index-generating system 126 will be described below in connection with FIG. 9.

A training system 128 produces one or more machine-trained models that govern the operation of parts of the computing system 102, based on a set of training examples in a data store 130. For example, one aspect of the training system 128 produces the universal encoding component (UEC) that generates language-agnostic vectors. This aspect of the training system 128 is described below in connection with FIG. 10. Another aspect of the training system 128 generates context vectors. This aspect of the training system 128 is described below in connection with FIG. 8.

Finally, FIG. 1 indicates that the computing system 102 can include one or more other systems 132. For example, the computing system 102 can include a downstream system that further operates on any information retrieved from the index.

Figure 2:
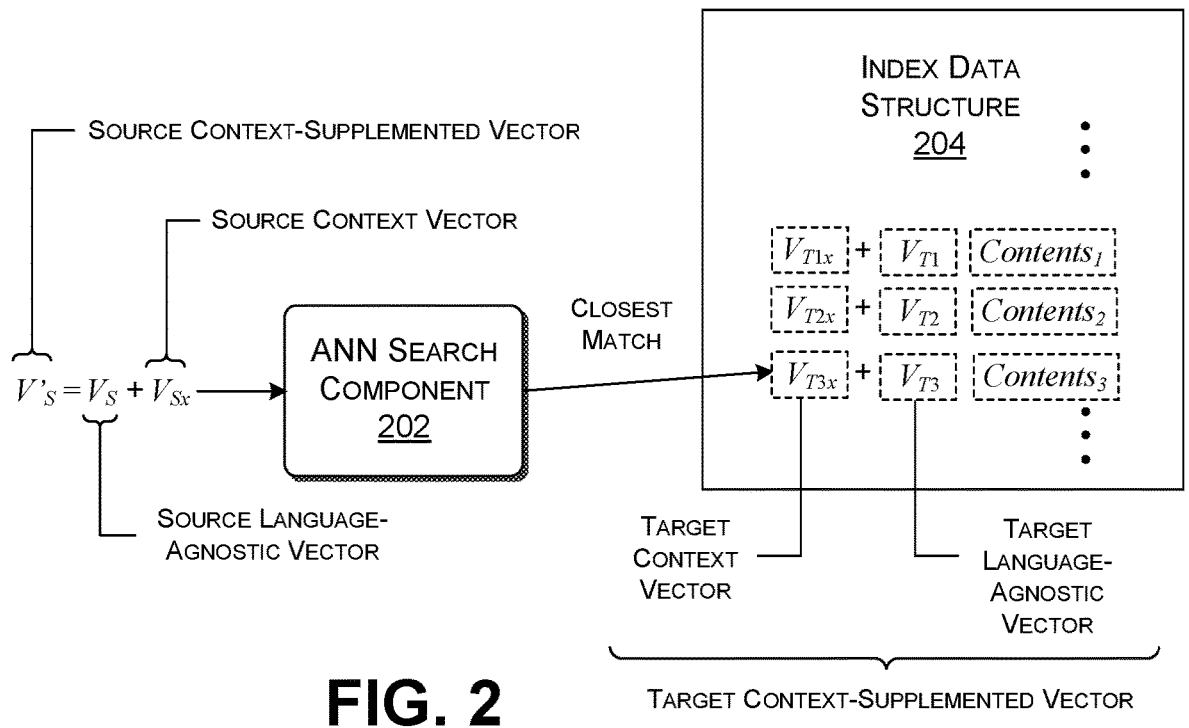
FIG. 2 shows an approximate nearest neighbor (ANN) component for searching the index of FIG. 1.

FIG. 2 shows one implementation of the index-searching component 116 of FIG. 1. The index-searching component 116 uses an approximate nearest neighbor (ANN) component 202 to find index entries in an index data structure 204. To review the terminology established above, a source data item S is represented by a combination of a source language-agnostic vector ($V_S$) and a source context vector ($V_{Sx}$). That combination is referred to as a source context-supplemented vector ($V_S'$). Each candidate target data item T, associated with an index entry, is represented by a combination of a target language-agnostic vector ($V_T$) and a target context vector ($V_{Tx}$). That combination is referred to as a target context-supplemented vector ($V_T'$). Each index entry has a searchable field that includes the context-supplemented vector. The ANN component 202 finds those index entries having target context-supplemented vectors that are closest in vector space to the source context-supplemented vector.

A "language vector," as the term is used herein, refers to a particular kind of context vector that specifies at least the natural language used to describe a corresponding data item. The language vector can optionally also describe other aspects of the context associated with the data item (meaning that it is not limited to describing language). A "language-supplemented vector" refers to a particular kind of context-supplemented vector that is formed by combining a language vector and a language-agnostic vector. The description will proceed below by using the terms "context vector" and "context-supplemented vector," but the explanation applies with equal force to the more specific case of language vectors and language-supplemented vectors.

In some implementations, the ANN component 202 can measure the similarity between the source data item S and a particular candidate target data item T using the following logic:

$$\text{Similarity} = \frac{V_S \cdot V_T + V_{Sx} \cdot V_{Tx}}{\sqrt{V_S^2 + V_{Sx}^2}\sqrt{V_T^2 + V_{Tx}^2}}. \quad (1)$$

Equation (1)'s numerator represents the sum of the dot product of $V_S$ and $V_T$ and the dot product of $V_{Sx}$ and $V_{Tx}$. Equation (1)'s denominator represents the product of the magnitudes of $V_S'$ (which represents the concatenation of $V_S$ and $V_{Sx}$) and $V_T'$ (which represents the concatenation of $V_T$ and $V_{Tx}$). The similarity between $V_S'$ and $V_T'$ represents the ratio of these two measures. The distance between $V_S'$ and $V_T'$ can be expressed as 1−Similarity. (Generally note that the dot product of two n-element vectors X and Y is $$\sum_i^n X_i Y_i,$$

and the magnitude of an n-element vector X is $$X^2 = \sqrt{\sum_i^n X_i^2}.)$$

Note that Equation (1) is set forth here in the spirit of illustration, not limitation; other implementations of the principles described herein can use other equations to define the union of context-based similarity and semantic-based similarity. For example, other implementations can apply weighting parameters (not shown) to the context vectors to control their impact on the Similarity measure.

In some implementations, each of the above described vectors ($V_S$, $V_{Sx}$, $V_S'$, $V_T$, $V_{Tx}$, $V_T'$) is a unit vector. A unit vector is a vector X having a magnitude of 1, e.g., such that $X^2=1$. In view of this property, a number of statements can be made regarding the relationship of the source data item and a candidate target data item. In some implementations, if the input source data item S and the candidate target data item T have matching contexts (e.g., by having the same language), then Equation (1) reduces to $(V_S \cdot V_T+1)/2$. This assumes that the dot product of $V_{Sx}$ and $V_{Tx}$ is 1 when the source data item and the target data item share the same context. For cases in which the source data item and the target data item have two different contexts (e.g., because they are expressed in different languages), the Similarity measure defined above will be no greater than $(V_S \cdot V_T+1)/2$.

The index-searching component 116 can use environment-specific criteria to define when a candidate target data item is considered a sufficiently close match to the source data item to warrant presentation to the user. For instance, the index-searching component 116 can use an environment-specific threshold value (or values) to make this determination. In addition, or alternatively, the index-searching component 116 can select the z candidate items that have the highest Similarity scores, etc., where z is an environment-specific value.

Generally note that the Similarity of Equation (1) depends, in part, on the assessed similarity between $V_S$ and $V_T$, as measured by the dot product of these two terms. The dot product reflects the extent to which the source data item and the target data have similar semantic content, without consideration of context. Equation (1) has the effect of bolstering the agreement between semantically-similar data items when the data items share the same context, and downgrading the agreement between semantically-similar data items when the data items do not have similar contexts. The use of context vectors may consequently alter the subset of target data items that are considered most relevant to the source data item, compared to the case in which context vectors are not used.

The above properties allow the search engine 104 to offer a more efficient performance compared to a vector-based search operation that does not take into consideration the use of context vectors. For example, without the use of context vectors, the ANN component 202 may traverse the data structure 204 to identify a set of target language-agnostic vectors that most closely match the source language-agnostic vector. But there is no assurance that the target language-agnostic vectors that are found correspond to target data items that are suitable for the user who is conducting the search. For example, in some cases, the user may be an English-speaking individual who understands only English, whereas the identified target data items may include some data items that are expressed in foreign languages (relative to the English). This outcome is likely, in fact, given that the search is conducted on the basis of language-agnostic vectors. Upon discovering that it has identified out-of-context target data items, the ANN component 202 may be forced to repeat its interrogation of the index data structure 204 one or more times until it identifies a requisite number of target data items that have the appropriate context. These added iterations worsen the latency at which the search engine 104 provides search results to the user. These added iterations also consume additional computing resources compared to the case in which the ANN component 202 makes use of context vectors. The computing resources consumed in the course of conducting the search include processor-related resources, memory-related resources, communication-related resources, etc.

A developer does not necessarily solve the above-stated problem by simply providing output results to the user that include out-of-context target data items. For instance, a user who receives information regarding foreign language target data items will typically be displeased with the results. This may cause the user to reformulate his or her search in hopes of identifying additional context-appropriate target data items. This iterative search process consumes time and computing resources, and may be burdensome to the user.

Likewise, a developer does not necessarily solve the problem by simply discarding out-of-context data items. This strategy may result in the failure to identify the full set of target data items that most closely match the source data item and the user's source context, and/or may result in serving in-context target data items that nonetheless have only weak semantic relevance to the source data item.

The search engine 104 solves the above problem by jointly taking into account both the degree to which the target data items semantically match the source data item and the degree to which the target data items share the same context as the source data item. This enables the search engine 104 to more directly converge on target data items that are both semantically and contextually relevant, compared to the above-described alternative approach (which does not use context vectors). That is, the search engine 104 can eliminate or reduce the number of search operations that are required to provide its output results, compared to the case in which context vectors are not used.

In some situations, the search engine 104 may outright exclude out-of-context target data items. But this is not necessarily so. In some situations, there may be only a few target data items that are good semantic matches for the source data item, but these target data items are expressed in a foreign language (relative to the user's preferred native language). The search engine 104 may include these target data items in its search results due to the dearth of semantically-relevant target data items in the user's own language. Equation (1) establishes the manner in which the search engine 104 balances semantic relevance and context appropriateness. The search engine 104 can use appropriately-selected threshold values to prevent undesired results, e.g., by disqualifying a target data item that is the best match for the source context, but which expresses a markedly different meaning compared to the source data item.

More generally stated, the computing system 102 of FIG. 1 solves a technical problem in which the source data item resolves (e.g., hashes) into a lookup key (e.g., the "source vector") that maps to plural target data items that are associated with the same lookup key, but wherein only some of those target data items are good matches for the source data item. Without the benefit of the technique described herein, in some cases, a computing system would be required to repeatedly probe the index until it located a sufficient number of target data items that are actual good matches for the source data item. Alternatively, or in addition, the computing system would be required to probe the index to find a first set of candidate target data items, and then filter this set to identify a truly relevant smaller subset of target data items. As noted above, these operations are inefficient because they increase the number of computational steps required to find suitable target data items, and thus waste time and computing resources. The computing system 102 described herein solves this problem by adding a distinguishing offset (e.g., the source context vector) to the source lookup key, to produce a supplemented lookup key (e.g., a source context-supplemented vector) and adding distinguishing offsets to each existing key in the index (e.g., which produces a target context-supplemented vector). The computing system 102 can leverage the supplemented keys to more directly identify target data items that are good matches of the source data item, without incurring the kind of inefficiencies noted above.

More specifically, consider a computing system that does not use the kind of context vectors described herein. Assume that the goal of that computing system is to use any type of ANN technique to retrieve a desired set of N relevant target data items. To satisfy this objective, the computing system may be configured to use the ANN technique to retrieve a set of M candidate data items, where M is larger than N. Subsequently, the computing system can filter the M retrieved data items to extract N target data items that are considered most relevant to the user (e.g., which are expressed in the user's preferred language). Even with this provision, there is no guarantee that the above approach will identify at least N relevant target data items. The probability of identifying N relevant target data items can be increased by choosing a suitably large M, e.g., such that M>>N. But latency also increases as M grows larger; this is because it takes time to find the additional candidate target items and then filter them. In contrast, in the computing system 102 of FIG. 1, M=N, resulting in reduced latency and reduced consumption of computing resources, compared to the computing system described above that does not make use of context vectors.

The above technical improvement extends to different environments associated with different kinds of data items, and is not limited to the processing of linguistic data items. For example, the computing system 102 can use the above improvement to hash an original file identifier into an original lookup key, add a contextual offset of the original identifier to produce a supplemented lookup key, and use the supplemented lookup key to find files that are also assigned supplemented keys. To nevertheless facilitate explanation, this document will continue to describe the improvement in the realm of linguistic processing.

Returning to the FIG. 2, the ANN component 202 can use any ANN technique to search the index data structure 204. Examples of ANN techniques include: various kinds of locality-sensitive hashing (LSH) techniques; various tree partition techniques; various neighborhood-based techniques, and so on. One tree-based technique, for example, uses k-means clustering to cluster vectors into successively smaller regions. The technique represents these clusters as a hierarchical tree. This technique finds those vectors that are closest to a given source vector by traversing the tree from its root node to its leaf nodes.

One neighborhood-based technique, the Hierarchical Navigable Small World (HNSW) algorithm, organizes vectors in a series of levels. Advancing from the top to bottom, the levels have links between vectors of successively smaller length. The HNSW algorithm finds those vectors that are closest to a given source vector by traversing the levels from top to bottom. The HNSW algorithm begins its search on each level at a vector identified by the HNSW algorithm in the preceding layer (if any).

Figure 3:
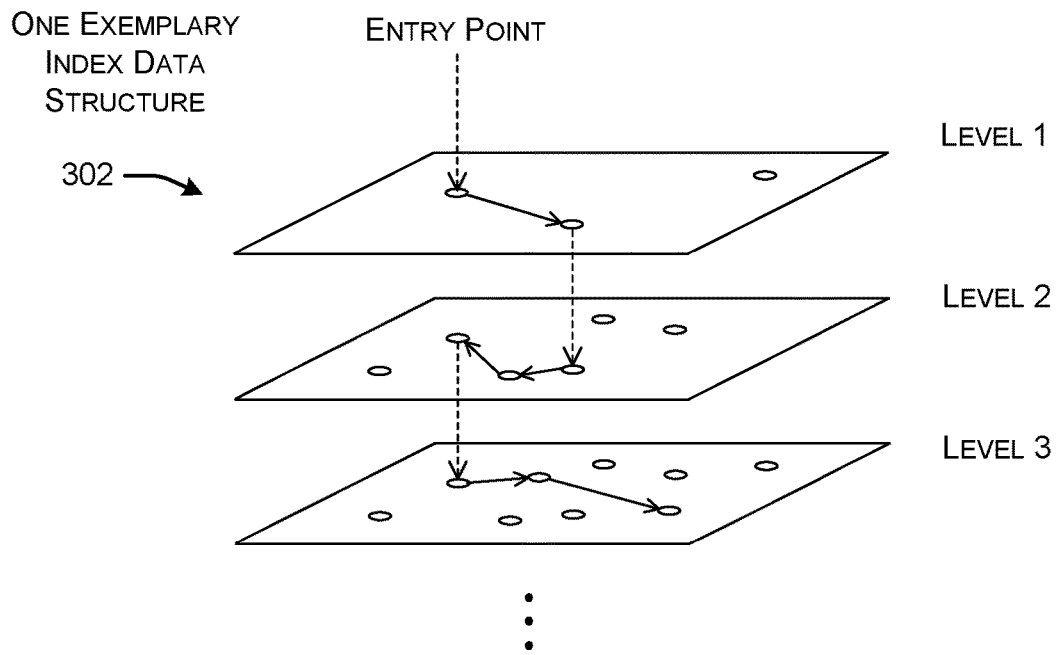
FIG. 3 shows an example of a data structure that can be used by one type of ANN component.

FIG. 3 provides a demonstration of how the ANN component 202 may interrogate a data structure 302 using the HNSW algorithm. The data structure 302 includes at least three representative levels. The ANN component 202 begins its search at level L1 at a randomly chosen entry point. The ANN component 202 finds the target context-supplemented vector that is most similar to the source context-supplemented vector at level L1. The ANN component 202 then advances to level L2, starting at the target context-supplemented vector identified by the ANN component 202 in the level L1. The ANN component 202 repeats this process until it reaches the bottommost level. The target context-supplemented vectors that the ANN component 202 identifies in the bottommost level correspond to a set of target data items that are the best matches for the input source data item.

In a graph construction stage, the index-generating system 126 (of FIG. 1) inserts target context-supplemented vectors into layers of the data structure 302 in incremental fashion based on an exponentially-decaying probability distribution. Based on this operation, the index-generating system 126 will assign a progressively-diminishing number of target context-supplemented vectors to the levels, as the levels advance from the bottommost level to the topmost level.

The above-noted technical benefits of the search engine 104 can be expressed in the illustrative context of the example of FIG. 3. Through its use of context vectors, the ANN component 202 can more efficiently advance through the data structure 302 to reach the target data items that are truly relevant to the source data item, compared to the case in which context vectors are not used. This further means that the ANN component 202 has a reduced chance of retrieving out-of-context target data items compared to the strategy described above. This advantage, in turn, eliminates or reduces the need for the ANN component 202 to repeat its interrogation of the data structure 302 to find appropriate target data items.

The above ANN techniques are described above in the spirit of illustration, not limitation; the ANN component 202 can apply any ANN technique to locate appropriate target context-supplemented context vectors, given a specified source context-supplemented context vector. Background information regarding the general topic of ANN, as applied to general datasets, can be found in LI, et al., "Approximate Nearest Neighbor Search on High Dimension Data—Experiments, Analyses, and Improvement," arXiv: 1610.02455v1 [cs.DB], Oct. 8, 2016, 26 pages. Background information regarding the general topic of the HNSW algorithm, as applied to general datasets, can be found in MALKOV, et al., "Efficient and Robust Approximate Nearest Neighbor Search Using Hierarchical Navigable Small World Graphs," arXiv:1603.09320 [cs.DS], Aug. 14, 2018, 13 pages.

Figure 4:
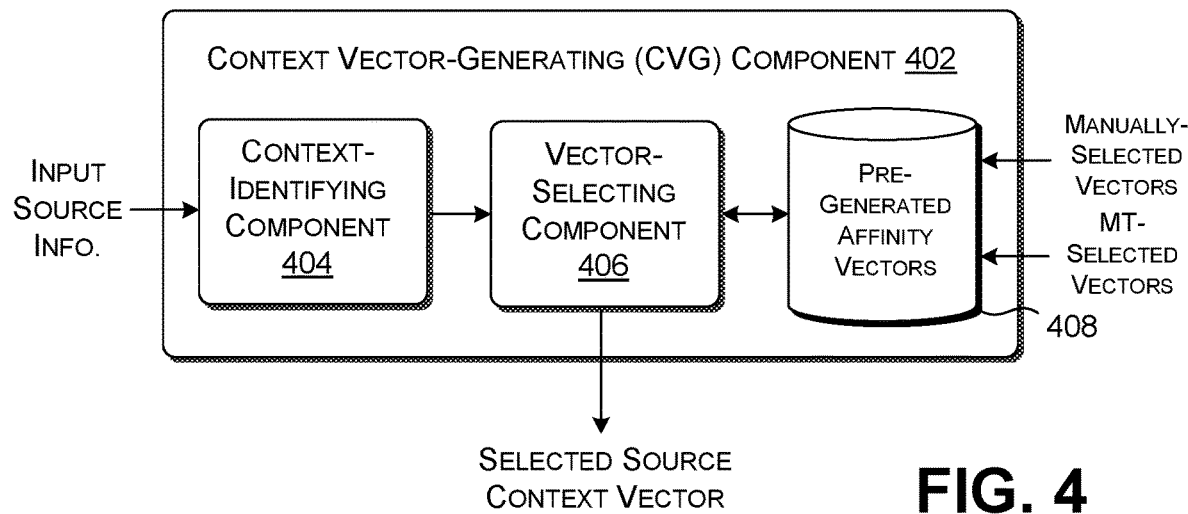
FIG. 4 shows one implementation of a source vector-generating component that generates a source context vector for use in the computing system of FIG. 1.
Figure 5:
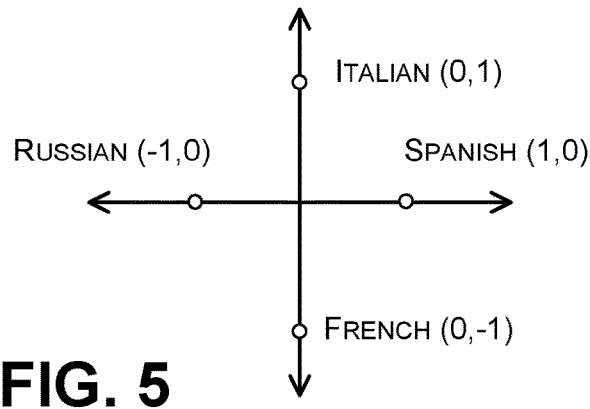
FIG. 5 shows a set of context vectors that are manually chosen.

FIG. 4 shows a context vector-generating (CVG) component 402 for generating a source context vector. The context-supplementing component 114 (of FIG. 1) uses the CVG component 402 to produce the source context vector $V_{Sx}$ that is subsequently combined with the source language-agnostic vector $V_S$, to produce the source context-supplemented vector $V_S'$.

The CVG component 402 includes a context-identifying component 404 which receives source context information that describes the source context. Based on this input information, the CVG component 402 generates one or more source context parameters that describe different aspects of the source context. The context-identifying component 404 can generate each source context parameter in different respective ways. For example, the context-identifying component 404 can identify the natural language used to express the source data item using a dictionary lookup operation, a machine-trained classification model, etc., or any combination thereof. The context-identifying component 404 can identify the region associated with the source data item by using a lookup table or the like to map location information to region information. The location information, in turn can originate from any of: information extracted from a user profile and/or user device profile; information supplied by a location-determining mechanism provided by the user device 106 (such as a global positioning system mechanism or beacon-detection mechanism, etc.); information supplied by communication equipment provided by the computer network 108, etc. When authorized by the user, the context-identifying component 404 can identify the behavior of the user by consulting various click-log records maintained by the search engine 104 that describe prior source data items (e.g., queries) submitted by the user and prior selections made by the user in response to submitting the source data items. For instance, the context-identifying component 404 can identify the natural language in which the user most often submits queries, and/or the natural language of target data items that the user most often selects in response to submitting the queries. These examples should be interpreted in the spirit of illustration, not limitation; the context-identifying component 404 can identify yet other source context parameters.

A vector-selecting component 406 uses the source context parameters supplied to it by the context-identifying component 404 to select an appropriate source context vector from a data store 408. For example, the vector-selecting component 406 can use the set of source context parameters as a lookup key to find a source context vector that is appropriate for these parameters. This presumes that the data store 408 includes an index that identifies context vectors based on their corresponding source context parameters.

The data store 408 can include at least some context vectors that are manually selected by a human, such as a developer, administrator, and/or the end user. The user who creates the context vectors can select them so that they properly reflect the pairwise similarity among source contexts. To illustrate this point, consider the simplified example in which the context of a data item is solely based on the natural language used to express the data item. Further assume that there are four possible natural languages: Spanish, Italian, French, and Russian. As shown in the example of FIG. 6, a user may assign the Spanish language the vector (1,0), the Italian language the vector (0, 1), the French language the vector (0, −1), and the Russian language the vector (−1, 0). These context vectors are chosen so that the dot product of any pairing of context vectors properly expresses the degree to which the two languages are considered similar to each other. For instance, the dot product of two Spanish-language data items is 1, the dot product of a Spanish-language data item with an Italian-language data item (or a French-language data item) is 0, and the dot product of a Spanish-language data item and a Russian-language data item is −1. This assignment therefore establishes, for instance, that a Russian-language target data item would be considered the least relevant to a Spanish-language source data item, and a Spanish-language target data item would be considered the most relevant to a Spanish-language source data item. In this scenario, if the user inputs a source data item that is expressed in the Spanish language, the vector-selecting component 410 will consult the data store 408 and retrieve the source context vector (1, 0).

Figure 8:
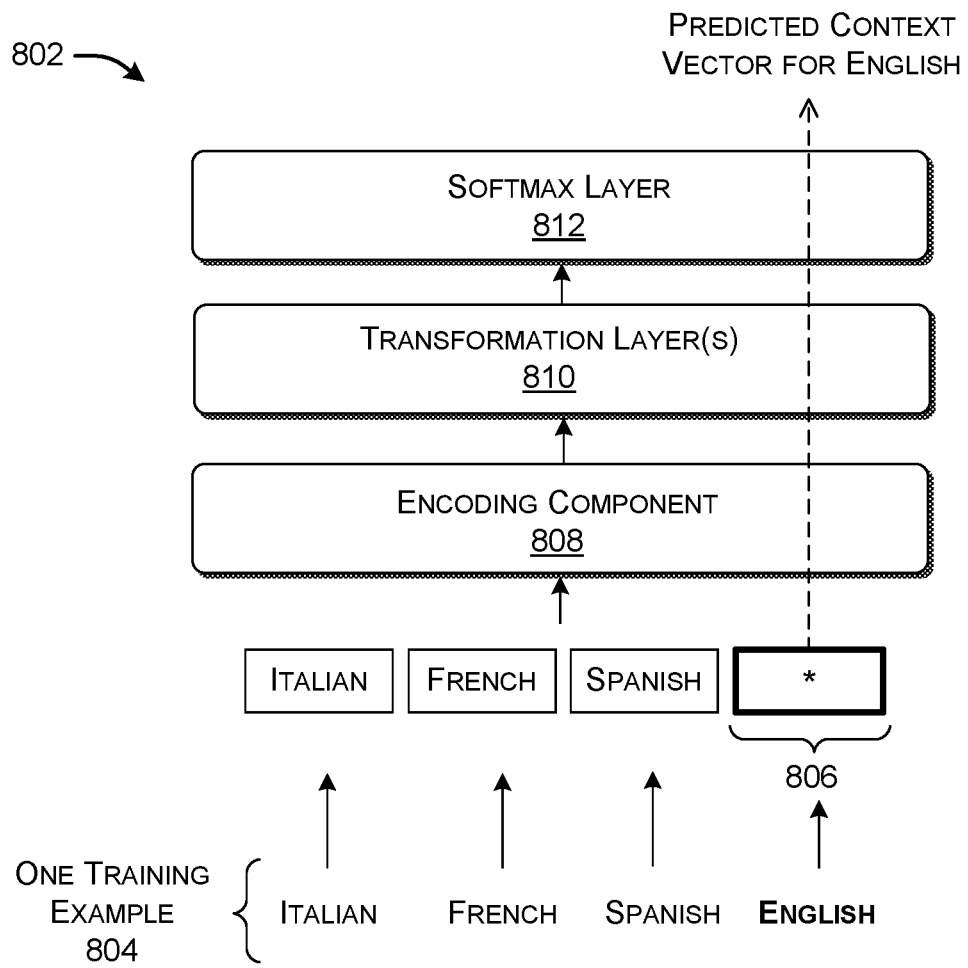
FIG. 8 shows one training system for training a model that can generate context vectors.

Alternatively, or in addition, at least some of the context vectors in the data store 408 may be automatically generated in an offline machine-training process (rather than manually selected). The machine-training process can learn the context vectors, in turn, based on a training data set that describes the language preferences of a group of users. For example, one training example may specify that a user in Montreal, Canada prefers to converse in French, but also finds English acceptable. Another training example may specify that a user in Brussels, Belgium may prefer to converse in French, but also finds Dutch acceptable. Another training example may specify that a user in Switzerland prefers to converse in French, but also finds German acceptable, and so on. Among other potential sources, this evidence is available from the search engine's click logs, user profiles, etc. Given a large amount of such data, the machine-training process can learn the extent to which pairs of languages relate to each other, e.g., by identifying the extent to which the French language is related to the languages of English, Dutch, German, etc. FIG. 8, to be described below, shows one implementation of a training system for generating context vectors. Other implementations can expand the principles set forth above to more complex context vectors, each of which expresses plural aspects of context (not just natural language).

Figure 6:
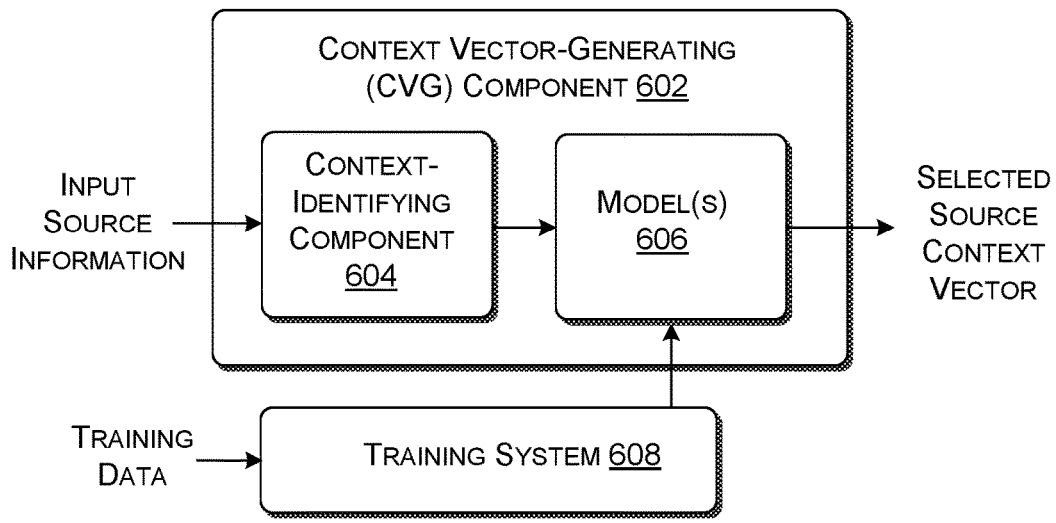
FIG. 6 shows another implementation of the source vector-generating component.

FIG. 6 shows another implementation of the context vector-generating (CVG) component 602. The CVG component 602 can include a context-identifying component 604 that is implemented in the same manner described above for the implementation of FIG. 4. To repeat, the context-identifying component 604 receives source context information that describes the source context, and maps that information into one or more source context parameters. The CVG component 602 then uses a machine-trained model 606 to map the source context parameters into a source context vector. In other words, the CVG 402 of FIG. 4 retrieves a pre-generated source context vector from the data store 408, whereas the CVG component 602 of FIG. 6 dynamically generates the source context vector at query time. The machine-trained model 606 can be implemented in any manner, such as a convolutional neural network (CNN), a transformer-based neural network, a sequence-to-sequence recursive neural network (RNN), etc. A training system 608 generates the machine-trained model 606.

Figure 7:
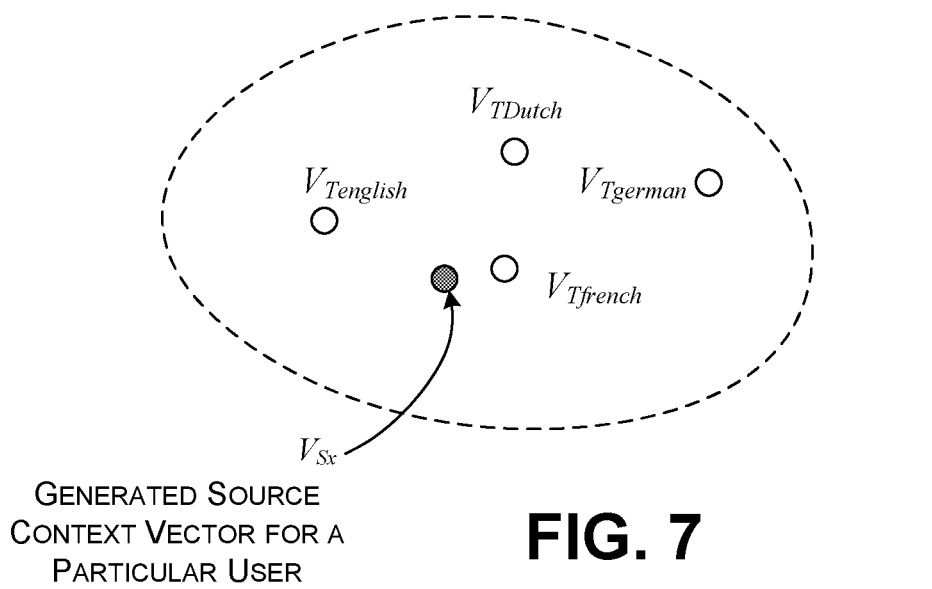
FIG. 7 shows a set of context vectors that are derived using a machine-training process.

FIG. 7 shows a vector space that includes four target context vectors that are automatically generated using a machine-training process. These four target context vectors ($V_{T\_de}$, $V_{T\_fr}$, $V_{T\_en}$, $V_{T\_du}$) are associated with the natural languages of German, French, English, and Dutch, respectively. FIG. 7 also shows a source context vector $V_{Sx}$ that is generated by the machine-trained model 606 of FIG. 6. Note that the source context vector lies closest to the French target context vector, and lies next-closest to the English target context vector. This placement may reveal that the user, who let's assume is a resident of Montreal, Canada, most likely prefers to converse in French, but, to a lesser extent, may also may find English acceptable.

FIG. 8 describes an illustrative training system 802 for learning context vectors. The training system 802 may be considered as one part of the training system 128 introduced in FIG. 1. The training system 802 processes a series of training examples. Each training example expresses a particular user's preference for particular contexts. In the simplified example of FIG. 8, each training example specifically expresses a particular user's ranked preferences for languages when conducting a search. For example, FIG. 8 shows a particular training example 804 in which the user's native (and most preferred) language is English. The prior search behavior of the user indicates that the user will also accept Spanish as a second-best option, French as a third-best option, and Italian as a fourth best option. Further assume that the example is set up to serve the goal of predicting the context vector for the English language.

The training system 802 replaces the English entry in the training example 804 with a masked placeholder 806. An encoding component 808 then converts each language entry into an appropriate input vector, e.g., using a lookup table, another machine-trained model, etc. One or more transformation layers 810 then convert the 410410-US-NP input vectors into one or more hidden state output vectors. The transformation layers 810 can be implemented in any manner. For example, the transformation layers 810 can be constructed in accordance with a Continuous Bag of Word (CBOW) architecture of the Word2Vec model. In a first layer, the Word2Vec model uses a first set of machine-trained weighting values to convert the input vectors into a series of intermediate output vectors. In a second layer, the Word2Vec model averages the series of intermediate output vector together, to produce a combined output vector. In a third layer, the Word2Vec uses a second set of machine-trained weighting values to transform the combined output vector into a final hidden state output vector. A Softmax layer 812 then maps the final output vector into a probability distribution, e.g., using a normalized exponential function. The probability distribution identifies the most likely interpretation of the masked placeholder 806. To the extent that the interpretation is correct, the probability distribution will indicate that the masked placeholder is English. Background information on the general topic of the Word2vec model can be found in MIKOLOV, et al., "Efficient Estimation of Word Representations in Vector Space," arXiv:1301.3781v3 [cs.CL], Sep. 7, 2013, 12 pages.

The use of the Word2Vec model, however, should be understood in the spirit of illustration, not limitation; other implementations can make use of other machine-trained models. For example, in a transformer-based approach, the transformation layers 810 can use one or more transformer-based neural network blocks to transform each input vector into a corresponding hidden state output vector. Each transformation block includes at least one self-attention mechanism. The Softmax layer 812 (or any classification model) can map the hidden state vector for the masked placeholder 806 into a prediction of the language associated with the masked placeholder 806. Background information on the general topic of the transformer model can be found in VASWANI, et al., "Attention Is All You Need," arXiv: 1706.03762v5 [cs.CL], Dec. 6, 2017, 15 pages.

Overall, the training system 802 processes a plurality of examples in the above-described manner while adjusting weighting values through backpropagation, in accordance with some specified objective function. One objective function attempts to minimize the error rate in the predictions generated by the Softmax layer 812. The training system 802 can adjust the weighting values in accordance with the objective function using any training approach, such as Stochastic Gradient Descent. Once fully trained, the vectors produced by the transformation layers 810 for different native languages constitute the context vectors for those respective native languages. The training system 802 adds these context vectors to the data store 408 of FIG. 4, indexed by context parameter information associated with the respective context vectors.

Another training system (not shown) can use a similar approach to train the machine-trained model 606 used in the CVG component 602, based on a set of training examples. Each positive training example specifies a set of source context parameters and a source context vector that is considered appropriate for the source context parameters.

For each training example, the training system submits the example's set of source context parameters to a model of any type, such as a CNN, RNN, transformer-based model, etc. The model uses one or more transformation layers to map the source context parameters into a predicted source context vector. Over the training process, the training system attempts to progressively increase the accuracy with which the model produces correct context vectors (where the positive training examples themselves establish what context vectors are considered correct). The training process yields a machine-trained model that is configured to place a context vector in vector space near other context vectors that share similar respective contexts. FIG. 7 provides an example of this query-time behavior.

Figure 9:
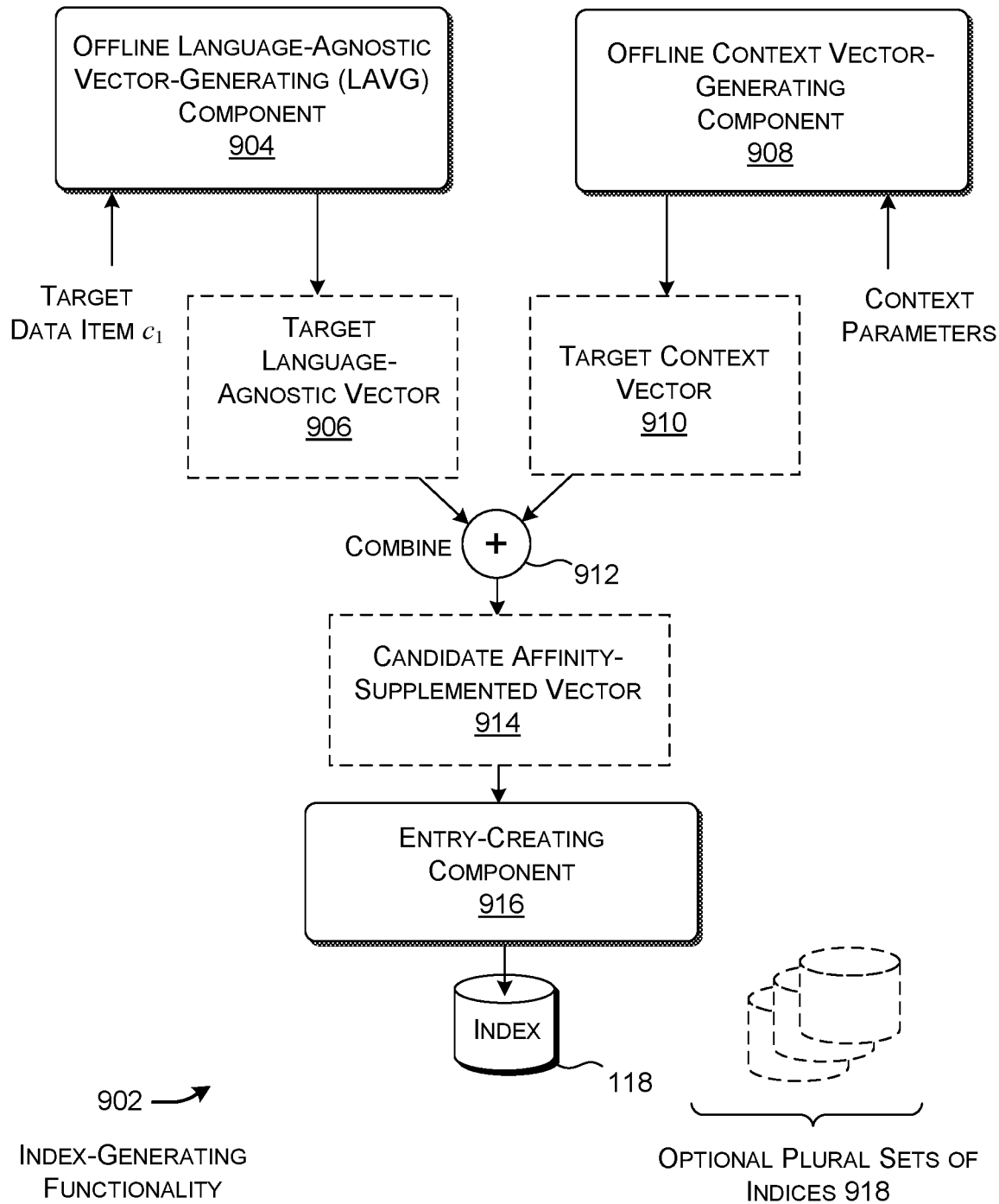
FIG. 9 shows functionality for generating entries in the index, for use in the computing system of FIG. 1.

FIG. 9 shows index-generating functionality 902 for producing the index entries in the index. The index-generating system 126 (of FIG. 1) can perform at least aspects of the operations shown in FIG. 9. The index-generating functionality 902 can generate at least some of the information in the index entries in an offline process. The index-generating functionality 902 can also adjust the information in its index entries on a periodic and/or demand-driven basis.

An offline language agnostic vector-generating (LAVG) component 904 performs the same function as the LAVG component 112 of FIG. 1. That is, the LAVG component 904 uses a machine-trained model (the UEC) to convert a particular target data item to a target language-agnostic vector 906. To repeat, the target language-agnostic vector 906 is considered agnostic with respect to natural language because it expresses the concepts conveyed by the target data item in a manner that is independent of the language used to express the target data item. This means that another target data item that has the same semantic content as the input target data item, but is expressed in a different natural language than the input target data item, will map to the same language-agnostic vector, with some environment-specific degree of error.

A context vector-generating component 908 performs the same function as the context vector-generating components (402, 602) of FIG. 4 and FIG. 6. But in this case, the context vector-generating component 908 maps a set of target context parameters into an appropriate target context vector 910 (rather than mapping a set of source context parameters into a source context vector). To repeat, in a first approach (of FIG. 4), the context vector-generating component 908 can use a lookup operation to find an appropriate target context vector 910 in a data store of pre-generated target context vectors. In a second approach (of FIG. 6), the context vector-generating component 908 can use a machine-trained model to map the set of target context parameters into a target context vector.

The combining component 912 combines the target language-agnostic vector 906 with the target context vector 910, to produce a candidate context-supplemented vector 914. For instance, the combining component 912 can combine these two vectors (906, 910) by concatenating them. Finally, an entry-creating component 916 creates an index entry in the index for the target data item under consideration. The index entry includes context-supplemented vector 914, which functions as a lookup key, together with other index contents (e.g., a pointer, etc.).

In one approach, the index-generating system 126 produces the same index for use by all users, regardless of their regional affiliation and other characteristics. In other implementations, the index-generating system 126 can produce two or more separate indices 918 for use by two or more broad groups of users. For example, the index-generating system 126 can produce a first index for Europe, a second index for the Far East, and so on. Different indices may include different distributions of target context vectors to reflect their associated region-specific norms. For example, an index devoted to European users may position the four languages shown in FIG. 4 in vector space in a different manner than an index devoted to North American users. The use of two or more indices may result in better performance to users, at the expense of the need to maintain separate indices.

Figure 10:
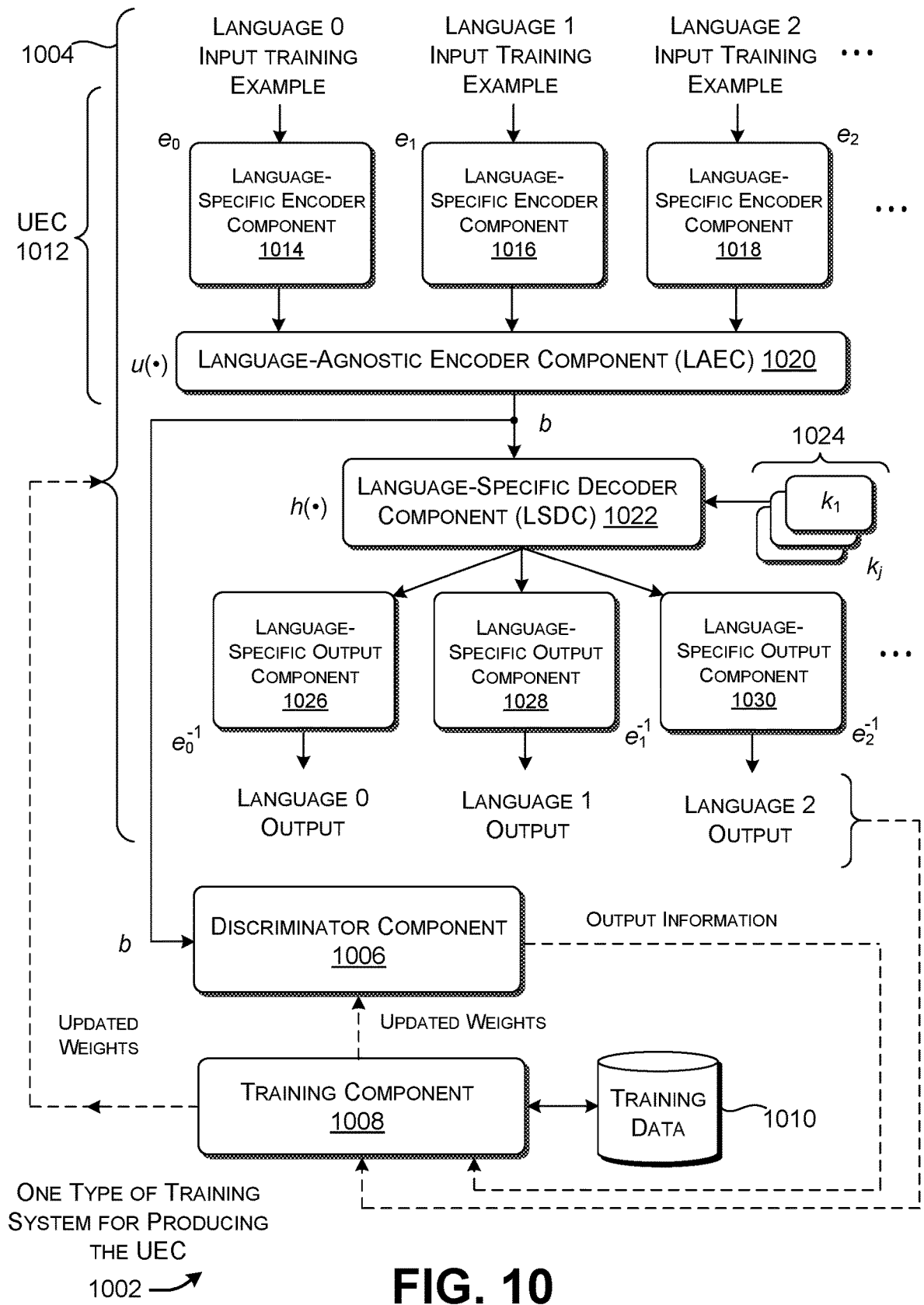
FIG. 10 shows a training system for producing a universal encoder component (UEC), for use in the computing system of FIG. 1. The UEC generates language-agnostic vectors.

FIG. 10 shows a training system 1002 for producing the universal encoder component (UEC). The UEC converts a linguistic expression in a natural language into a language-agnostic form. Both the language-agnostic vector-generating component 112 of FIG. 1 and the language-agnostic vector-generating component 904 of FIG. 9 can use the UEC to produce language-agnostic vectors. The training system 1002 may be considered part of the training system 128 introduced above and shown in FIG. 1.

In one non-limiting implementation, the training system 1002 uses a generative adversarial network (GAN) to produce the UEC. In a first path of analysis, the GAN uses a language model component 1004 which maps a set of input training examples expressed in different natural languages into respective language-agnostic representations of those input training examples. The language model component 1004 then converts the language-agnostic representations into a set of predictive output results expressed in the same natural languages. For example, the language model component 1004 converts an English-language input phrase (such as the phrase, "A large part of the") into a language-agnostic representation of that input phrase, and then converts that language-agnostic representation into an output result which predicts a next English word which will follow the input phrase (such as the word "evidence"). In a separate path of analysis, a discriminator component 1006 generates output information which can be used to assess an extent of coherence among different distributions of language-agnostic representations originating from different input training examples expressed in different natural languages.

A training component 1008 iteratively trains the GAN based on a set of training examples in a data store 1010. More specifically, the training component 1008 generates first loss information based on the predictive accuracy of the language model component 1004. It generates second loss information based on the output information generated by the discriminator component 1006. It then updates 410410-US-NP weighting values used by the language model component 1004 and the discriminator component 1006 based on the first loss information and second loss information, respectively. It repeats these operations a plurality of times until a prescribed degree of convergence is achieved.

In the course of the above-described training operation, the training component 1008 iteratively improves the predictive accuracy of the language model component 1004. Simultaneously, the training component 1008 improves the ability of the discriminator component 1006 to identify the coherence among distributions of language-agnostic representations that originate from different natural languages. The training component 1008 produces a universal encoder component (UEC) 1012 as an outcome of its training. As shown in FIG. 10, the UEC 1012 corresponds to those components of the language model component 1004 which produce the language-agnostic representation.

The GAN will now be described in generally top-down manner. Generally note that FIG. 10 illustrates the training system 1002 in the context of the processing of three input training examples, to produce a set of three predictive output results. But the training system 1002 can more generally be applied to the processing of a set of input training examples of any size v, where v≥2.

The language model component 1004 includes a set of language-specific encoder components (1014, 1016, 1018) for converting input training examples expressed in different natural languages into respective language-specific representations. Each input training example corresponds to a linguistic expression of any size and type having at least two words. For example, in a particular training operation, the training component 1008 can feed an English language Wikipedia document into the first language-specific encoder component 1014, a French language Wikipedia document into the second language-specific encoder component 1016, and a Chinese language Wikipedia document into the third language-specific encoder component 1018. These three documents can discuss any three topics, meaning that they need not represent translations of the same underlying content into three respective languages. In other words, these three documents need not originate from a parallel corpus of training examples.

In one implementation, each language-specific input component first maps the words in the input training example into embeddings using a pre-generated lookup table. Each language-specific input component then maps the embeddings into a language-specific representation of the training example. It performs this task using a machine-trained model. A language-agnostic encoder component (LAEC) 1020 assembles the language-specific representations provided by the language-specific encoder components (1014, 1016, 1018) and then maps them into language-agnostic representation information, denoted by b in FIG. 10. The LAEC 1020 performs this task using another machine-trained model.

Next, a language-specific decoder component (LSDC) 1022 formulates a language-specific decoded representation of each natural language associated with the set of input training examples. The LSDC 1022 performs this task for each language j by first retrieving rule information $k_j$ which parametrically describes the syntactic rules by which linguistic expressions are formulated in the language j. For example, the rule information $k_j$ can include one or more parameter values which specify the ordering of words in a sentence in the language j. Overall, the training system 1002 can include a set 1024 of rule information instances, e.g., each of which may be expressed as a vector of parameter values of size q. The LSDC 1022 also receives the language-agnostic representation information b generated by the LAEC 1020. The LSDC 1022 generates the language-specific decoded representation for each language j by concatenating the language-agnostic representation information b with the rule information $k_j$, and then mapping that concatenation into the language-specific decoded representation, using a machine-trained model.

In a final stage, a set of language-specific output components (1026, 1028, 1030) perform the predictive function of the language model component 1004. They do this by converting the different language-specific decoded representations provided by the LSDC 1022 into a set of predictive output results in the respective natural languages (e.g., English, French, Chinese, etc.). For example, each language-specific output component can generate an output result which provides a prediction of a next word that will follow the corresponding input training example. In one implementation, each language-specific output component uses a machine-trained model to map a language-specific decoded representation into an intermediary output result. It then multiplies the intermediary output result by the transpose of the embedding table used by the counterpart language-specific encoder component. This yields the output result of the language-specific output component.

In a separate discriminator path, the discriminator component 1006 uses another machine-trained model to map the language-agnostic representation information b provided by the LAEC 1020 into output information. The training component 1008 uses the output information to compute a distance between pairs of distributions of training examples expressed in different natural languages. From the perspective of the set of training examples as a whole, each such pair defines a first distribution of training examples expressed in a first input language $j_\alpha$ and a second distribution of training examples expressed in a second input language $j_\beta$. In the context of processing English, French, and Chinese input training examples, the discriminator component 1006 generates output information from which the training component 1008 can compute the distance between each of the following pairs language-agnostic distributions: (1) English and English; (2) English and French; (3) English and Chinese; (4) French and English; (5) French and French; (6) French and Chinese; (7) Chinese and English; (8) Chinese and French; and (9) Chinese and Chinese. This set of pairs is symmetric in the sense, for instance, that the output information for the pair {English, French} is equivalent to the output information for the pair {French, English}.

The operation of the language model component 1004 can be mathematically expressed as follows. To begin with, the LAEC 1020 performs a function u that produces the language-agnostic representation information b, as given by:

$$b = u \circ e^j(w_0^j, w_1^j, \ldots, w_i^j) \qquad (2).$$

The function $e_j$ represents the transformation performed by each language-specific input component for language j, with respect to a set of i words ($w_0^j, w_1^j, \ldots, w_i^j$) of an input training example. More specifically, in one non-limiting case, the function $e_j$ maps a set of i integers representing tokens (e.g., words) into a set of i language-specific word vectors, each of size g. The function u maps this set of word vectors into the language-agnostic representation information b for the input training example in the language j, itself representing a set of i vectors, each of size g.

The LSDC 1022 receives the language-agnostic representation information b from the LAEC 1020 and an instance of rule information $k_j$ for the input language j (of size q). Per a function h, the LSDC 1022 then maps this input information into a language-specific decoded representation for the language j, corresponding to a set of i vectors, each of size g.

Each language-specific output component for the language j then executes a predictive function $e_j^{-1}$ on the language-specific decoded representation to yield a language-specific output result for the language j. (Here, the superscript of −1 indicates that each language-specific output component performs the inverse of the operation associated with its counterpart language-specific encoder component, e.g., by mapping vector information back into token space.) The output result specifies the probability of a predicted word $w_i^j$ in the language j, given a set of preceding words in the input training example, expressed as $p_j(w_i^j | w_0^j, w_1^j, \ldots, w_{i-1}^j)$.

Overall, the operation of the language model component 1004, for each language j, is given by:

$$p_j(w_i^j | w_0^j, w_1^j, \ldots, w_{i-1}^j) = e_j^{-1}(h(b, k_j)) \qquad (3).$$

Now referring to the discriminator path, the training component 1008 computes the distance between each respective pair of distributions of languages ($j_\alpha, j_\beta$), as expressed mathematically by:

$$d(p(b|j_\alpha) \| p(b|j_\beta)) \quad (4).$$

More specifically, $p(b|j_\alpha)$ specifies the probability of the language-agnostic representation information b, given the language ja, while $p(b|bj_\beta)$ represents the probability of the language-agnostic representation information b, given the language $j_\beta$. Equation (4) overall expresses the distance d between these two representations. In one implementation, the training component 1008 computes the distance d as a Wasserstein ($W_1$) distance, also known as the earth mover distance. A Wasserstein distance may be conceptualized as the lowest net cost that it takes to piecewise-transform a first probability distribution into a second probability distribution. The training component 1008 stipulates that, given two languages $j_\alpha$ and $j_\beta$, the distribution of the universal representations should be within ϵ with respect to the $W_1$ of each other.

Overall, for the case of m input languages and N input training examples, each having n words, the training component 1008 governs its training based on the following loss function:

$$\max_\theta \sum_{\alpha=0}^{m} \sum_{i=0}^{N} \log p_{j_\alpha}(w_{i,0}^\alpha, \ldots, w_{i,n}^\alpha; \theta) - \frac{\lambda}{m^2} \sum_{\alpha=0}^{m} \sum_{\beta=0}^{m} d(p(b|j_\alpha) \| p(b|j_\beta)). \quad (5)$$

The top half of Equation (5) represents an attempt to maximize the accuracy of predictions generated by the language model component 1004, through iterative refinement of its parameter values θ. This part of the loss function references a probability pa given by:

$$p(w_0, \ldots, w_n) = \prod_{i=1}^{n} p(w_i | w_0, \ldots, w_{i-1}). \quad (6)$$

Equation (6) indicates that a probability measure for a document having a series of words is reflected by the product of the probabilities associated with each of its words. Equation (6) expresses the probability of each word, in turn, in a conditional manner based on a set of words that precede it.

The bottom part of Equation (5) represents an attempt to minimize the differences between the pairs of language-agnostic representations of documents. As noted, the training component 1008 can compute the distance measure d in Equation (5) as a Wassertein distance measure. The symbol λ is a scaling factor that determines the impact of the second part of Equation (5) in the training operation.

Additional information regarding the type of model described above can be found in U.S. Pat. No. 10,963,644 to AGHAJANYAN, et al., which issued on Mar. 30, 2021. Note, however, that the UEC 1012 is described herein in the spirit of illustration, not limitation. Other implementations can use other types of models for producing language-agnostic vectors. For example, another training system (not shown) can produce a model by processing parallel corpora of training examples. The training system can attempt to produce a model that minimizes the differences between language-agnostic vectors across sets of training examples that express the same concepts in different languages. Note that the use of parallel corpora is not necessary in the training system 1002 shown in FIG. 2. Still more generally, the computing system 102 can use any hashing mechanism to map an original source data item into a source lookup key, not limited to a machine-trained model that maps a linguistic data item into a source vector.

B. Illustrative Processes

Figure 11:
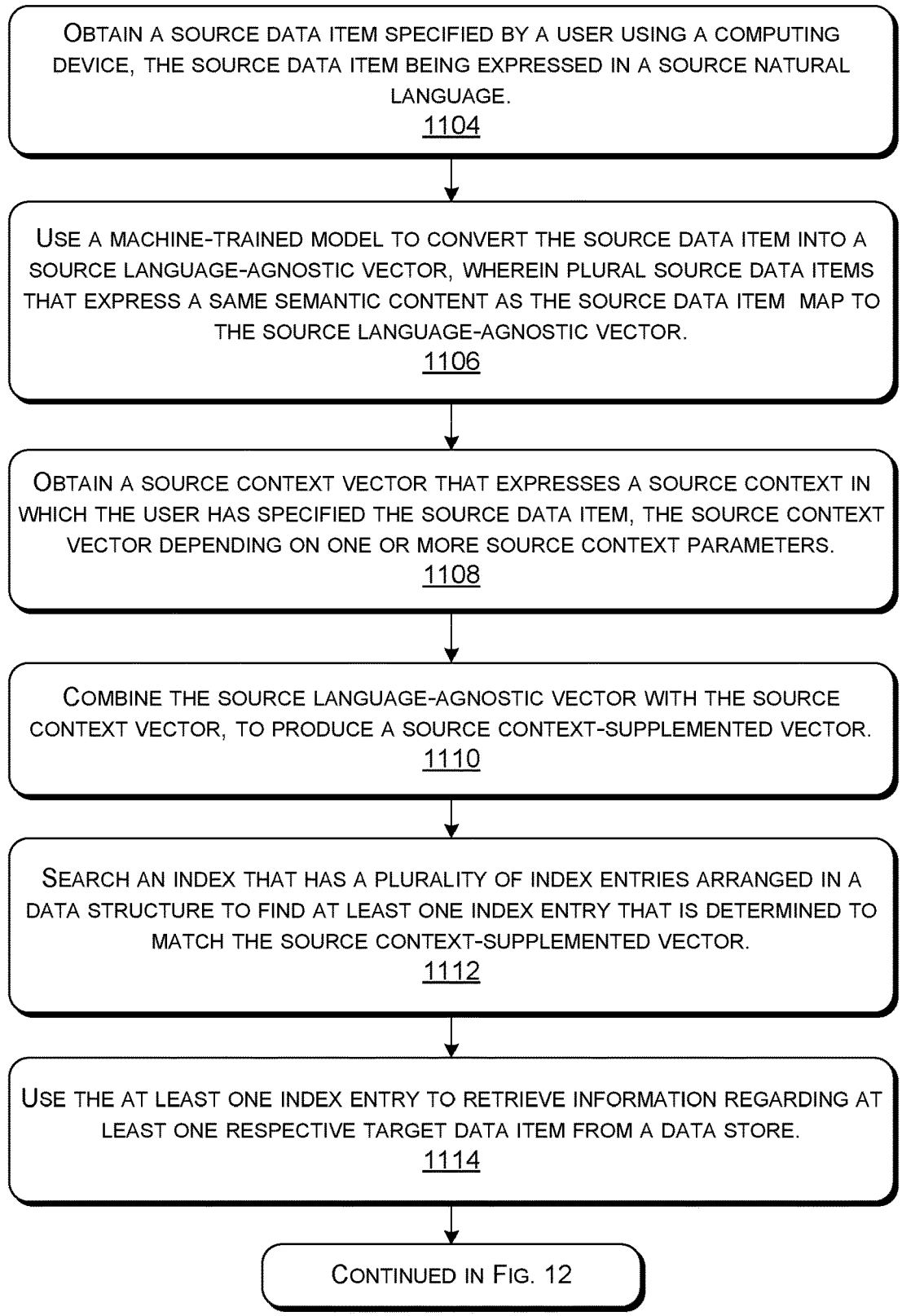

FIGS. 11 and 12 together show a process 1102 that explains the operation of the computing system 102 of Section A in flowchart form. Since the principles underlying the operation of the computing system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

In block 1104 of FIG. 11, the computing system 102 obtains a source data item specified by a user using the user device 106, the source data item being expressed in a source natural language. In block 1106, the computing system 102 uses a machine-trained model 1012 to convert the source data item into a source language-agnostic vector, wherein plural source data items that express a same semantic content as the source data item map to the source language-agnostic vector. In block 1108, the computing system 102 obtains a source context vector that expresses a source context in which the user has specified the source data item, the source context vector depending on one or more source context parameters. In block 1110, the computing system 102 combines the source language-agnostic vector with the source context vector, to produce a source context-supplemented vector. In block 1112, the computing system 102 searches an index that has a plurality of index entries arranged in a data structure 204 to find at least one index entry that is determined to match the source context-supplemented vector. In block 1114, the computing system 102 uses the at least one index entry to retrieve information regarding at least one respective target data item from a data store 124.

In block 1202 of FIG. 12, the computing system 102 provides the information that is retrieved to the user. Each index entry in the index is associated with a target data item. The index entry has a field that includes a target context-supplemented vector that is made up of a target language-agnostic vector and a target context vector. The target language-agnostic vector is generated by the machine-trained model 1012 and expresses a semantic content of the target data item that is independent of a natural language used to express the target data item. The target context vector expresses a target context associated with the target data item that depends on one or more target context parameters. The searching operation identifies the at least one index entry by comparing the source context-supplemented vector with a plurality of target context-supplemented vectors in the index. Further, the searching operation identifies the at least one index entry with fewer index interrogation operations by using source and target context vectors, compared to a search operation that does not use the source and target context vectors.

In some implementations, each context vector more specifically corresponds to a language vector. A language vector refers to a particular kind of context vector that specifies (via one or more corresponding context parameters) at least the natural language used to describe a corresponding data item, among other possible aspects of context. In some implementations, each context-supplemented vector is a language supplemented vector. A language-supplemented vector refers to a particular kind of context-supplemented vector that is formed by combining a language vector and a language-agnostic vector.

The method described above is a particular implementation of a more general process that can be summarized as follows. In a first step, the computing system 102 obtains a source data item specified by a user using the user device 106. In a second step, the computing system 102 uses a machine-trained model 1012 or any other hashing mechanism to convert the source data item into an original source lookup key, wherein a set of different source data items map to the same original source lookup key. In a third step, the computing system 102 obtains a source distinguishing offset that further describes at least one aspect of the source data item, the source distinguishing offset depending on one or more source context parameters. In a fourth step, the computing system 102 combines the original source lookup key with the source distinguishing offset, to produce a source offset-supplemented key. In a fifth step, the computing system 102 searches an index that has a plurality of index entries arranged in a data structure to find at least one index entry that is determined to match the source offset-supplemented key. Each index entry in the index has a field that includes a target-supplemented key that is formed in the same manner described above, e.g., by combining an original target key with a target distinguishing offset, to produce a target offset-supplemented key. The computing system 102 compares the source offset-supplemented key against each target offset-supplemented key. The computing system can apply the above technique to different environments, characterized by different kinds of data items to be searched.

C. Representative Computing Functionality

FIG. 13 shows an example of computing equipment that can be used to implement any of the systems summarized above. The computing equipment includes a set of user computing devices 1302 coupled to a set of servers 1304 via a computer network 1306. Each user computing device can correspond to any device that performs a computing function, including a desktop computing device, a laptop computing device, a handheld computing device of any type (e.g., a smartphone, a tablet-type computing device, etc.), a mixed reality device, a wearable computing 410410-US-NP device, an Internet-of-Things (IoT) device, a gaming system, and so on. The computer network 1306 can be implemented as a local area network, a wide area network (e.g., the Internet), one or more point-to-point links, or any combination thereof.

FIG. 13 also indicates that the search engine 104, index-generating system 126, and the training system 128 of FIG. 1 can be spread across the user computing devices 1302 and/or the servers 1304 in any manner. For instance, in one case, the search engine 104 is entirely implemented by one or more of the servers 1304. Each user may interact with the servers 1304 via a browser application or other programmatic interface provided by a user computing device. In another case, the search engine 104 is entirely implemented by a user computing device in local fashion, in which case no interaction with the servers 1304 is necessary. In another case, the functionality associated with the search engine 104 is distributed between the servers 1304 and each user computing device in any manner.

Figure 14:
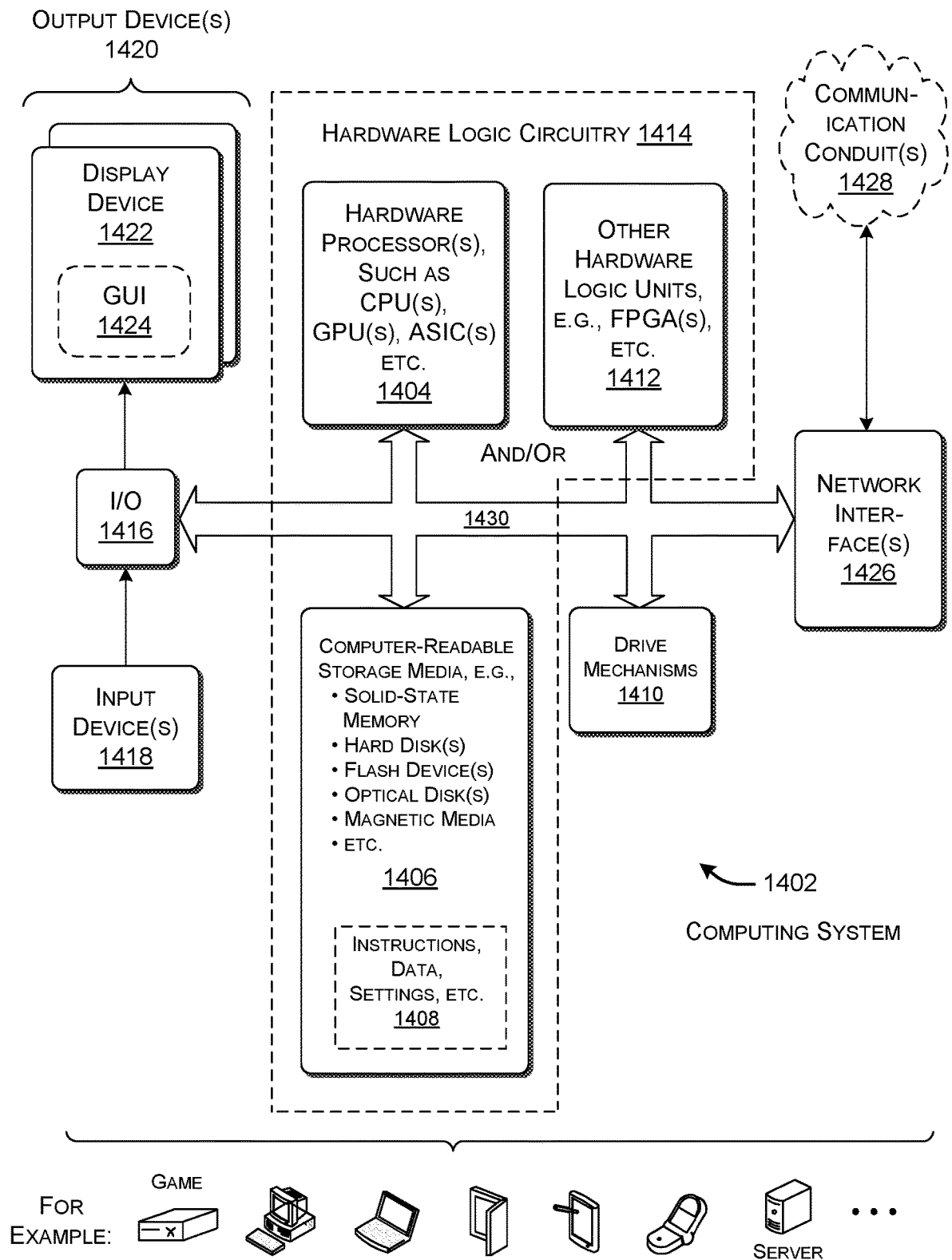
FIG. 14 shows an illustrative type of computing system that can be used to implement any aspect of the features shown in the foregoing drawings.

FIG. 14 shows a computing system 1402 that can be used to implement any aspect of the mechanisms set forth in the above-described figures. For instance, the type of computing system 1402 shown in FIG. 14 can be used to implement any user computing device or any server shown in FIG. 13. In all cases, the computing system 1402 represents a physical and tangible processing mechanism.

The computing system 1402 can include one or more hardware processors 1404. The hardware processor(s) 1404 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1402 can also include computer-readable storage media 1406, corresponding to one or more computer-readable media hardware units. The computer-readable storage media 1406 retains any kind of information 1408, such as machine-readable instructions, settings, data, etc. Without limitation, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable unit of the computing system 1402. Further, any instance of the computer-readable storage media 1406 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

The computing system 1402 may perform any of the functions described above when the hardware processor(s) 1404 carry out computer-readable instructions stored in any instance of the computer-readable storage media 1406. For instance, the computing system 1402 may carry out computer-readable instructions to perform each block of the processes described in Section B.

Alternatively, or in addition, the computing system 1402 may rely on one or more other hardware logic units 1412 to perform operations using a task-specific collection of logic gates. For instance, the hardware logic unit(s) 1412 may include a fixed configuration of hardware logic gates, e.g., that are created and set at the time of manufacture, and thereafter unalterable. Alternatively, or in addition, the other hardware logic unit(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 includes any combination of the hardware processor(s) 1404, the computer-readable storage media 1406, and/or the other hardware logic unit(s) 1412. That is, the computing system 1402 can employ any combination of the hardware processor(s) 1404 that execute machine-readable instructions provided in the computer-readable storage media 1406, and/or one or more other hardware logic unit(s) 1412 that perform operations using a fixed and/or programmable collection of hardware logic gates. More generally stated, the hardware logic circuitry 1414 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1414 that performs a particular function or combination of functions.

In some cases (e.g., in the case in which the computing system 1402 represents a user computing device), the computing system 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1402 can also include one or more network interfaces 1426 for exchanging data with other devices via one or more communication conduits 1428. One or more communication buses 1430 communicatively couple the above-described units together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 can include a hardware logic unit that integrates the functions of two or more of the units shown in FIG. 1. For instance, the computing system 1402 can include a system on a chip (SoC or SOC), corresponding to an integrated circuit that combines the functions of two or more of the units shown in FIG. 14.

The following summary provides a non-exhaustive set of illustrative examples of the technology set forth herein.

(A1) According to a first aspect, some implementations of the technology described herein include a computer-implemented method (e.g., the process 1102 of FIGS. 11 and 12), using one more computing devices (e.g., computing system 1402 of FIG. 14), for performing a lookup operation. The method includes: obtaining (e.g., 1104) a source data item specified by a user using a computing device (e.g., 106), the source data item being expressed in a source natural language; using (e.g., 1106) a machine-trained model (e.g., 1012) to convert the source data item into a source language-agnostic vector, wherein plural source data items that express a same semantic content as the source data item map to the source language-agnostic vector; obtaining (e.g., 1108) a source context vector that expresses a source context in which the user has specified the source data item, the source context vector depending on one or more source context parameters; combining (e.g., 1110) the source language-agnostic vector with the source context vector, to produce a source context-supplemented vector; searching (e.g., 1112) an index that has a plurality of index entries arranged in a data structure (e.g., 204) to find at least one index entry that is determined to match the source context-supplemented vector; using (e.g., 1114) the at least one index entry to retrieve information regarding at least one respective target data item from a data store (e.g., 124); and providing (e.g., 1202) the information that is retrieved to the user.

Each index entry in the index is associated with a target data item. The index entry has a field that includes a target context-supplemented vector that is made up of a target language-agnostic vector and a target context vector. The target language-agnostic vector is generated by the machine-trained model (e.g., 1012) and expresses a semantic content of the target data item that is independent of a natural language used to express the target data item. The target context vector expresses a target context associated with the target data item that depends on one or more target context parameters.

The search operation (e.g., 1112) identifies the at least one index entry by comparing the source context-supplemented vector with a plurality of target context-supplemented vectors in the index. Further, the search operation (e.g., 1112) can use an approximate nearest neighbor search process to identify at least one index entry with fewer index interrogation operations by using source and target context vectors, compared to a search operation that does not use the source and target context vectors. This expedites the processing of the source data item and consumes fewer computing resources compared to a search operation that does not use the source and target context vectors.

(A2) According to some implementations of the method of A1, the searching operation identifies the at least one index entry using an approximate nearest neighbor search process. In this process, the searching operation uses the source context vector to elevate a rank of a first target data item over a second target data item that both express a same semantic content as the source data item, the first target data item having a first-item target context vector that more closely matches the source context vector compared to a second-item context vector associated with the second target data item.

(A3) According to some implementations of any of the methods of A1 or A2, the searching operation involves traversing the data structure of the index using an approximate nearest neighbor search process, wherein the traversing the data structure is performed in a more direct manner compared to a search operation that does not use the source and target context vectors.

(A4) According to some implementations of any of the methods of A1-A3, the source data item is a query submitted by the user, and the target data item is another query that matches the query submitted by the user, or an answer to the query.

(A5) According to some implementations of any of the methods of A1-A4, the source data item is a query, and the target data item is a content item that matches the query.

(A6) According to some implementations of any of the methods of A1-A5, the one or more source context parameters include: a first source context parameter that describes the source natural language used to express the source data item; and/or a second source context parameter that describes a geographic region from which the user submits the source data item; and/or a third source context parameter that describes behavior of the user in conducting one or more prior searches. In some implementations, each context vector more specifically corresponds to a language vector. A language vector refers to a particular kind of context vector that specifies at least the natural language used to describe a corresponding data item, among other possible aspects of context. In some implementations, each context-supplemented vector is a language supplemented vector. A language-supplemented vector refers to a particular kind of context-supplemented vector that is formed by combining a language vector and a language-agnostic vector.

(A7) According to some implementations of the method of A6, the one or more source context parameters include the first source context parameter, and the second source context parameter, and the third source context parameter.

(A8) According to some implementations of any of the methods of A1-A7, the one or more target context parameters include at least one target context parameter that describes a target natural language used to express the target data item.

(A9) According to some implementations of any of the methods of A1-A8, the search operation generates a similarity measure between the source context-supplemented vector and the target context-supplemented vector by: forming a first product of the source language-agnostic vector and the target language-agnostic vector; forming a second product of the source context vector and the target context vector; forming a sum of the first product and the second product; generating a third product of the magnitudes of the source context-supplemented vector and the target context-supplemented vector; and forming a ratio of the sum and the third product.

(A10) According to some implementations of any of the methods of A1-A9, the operation of obtaining the source context vector includes: identifying the one or more source context parameters that describe the source context; and using the one or more source context parameters to look up the source context vector in a vector data store that includes plural source context vectors associated with plural respective source contexts.

(A11) According to some implementations of any of the methods of A1-A10, the operation of obtaining the source context vector includes: identifying the one or more source context parameters that describe the source context; and using another machine-trained model to map the one or more source context parameters to the source context vector.

(A12) According to some implementations of any of the methods of A1-A11, the index provides target context vectors selected from a vector data store that stores pre-generated target context vectors associated with respective target contexts, and wherein at least some of the target context vectors in the target vector data store are manually chosen.

(A13) According to some implementations of any of the methods of A1-A12, the index provides target context vectors selected from a vector data store that stores pre-generated target context vectors associated with respective target contexts, and wherein at least some of the target context vectors in the target vector data store are automatically chosen by a machine-training process based on item selection behavior exhibited by a plurality of users.

(B1) According to another aspect, some implementations of the technology described herein include another computer-implemented method (e.g., the process 1102 of FIG. 11), using one more computing devices (e.g., computing system 1402 of FIG. 14), for performing a lookup operation. The method includes: obtaining (e.g., 1104) a query specified by a user using a computing device (e.g., 106), the query being expressed in a query natural language; using (e.g., 1106) a machine-trained model (e.g., 1012) to convert the query into a query language-agnostic vector, wherein plural queries that express a same semantic content as the query map to the query language-agnostic vector; obtaining (e.g., 1108) a query context vector that expresses a query context in which the user has specified the query, the query context vector depending on one or more query context parameters, the one or more query context parameters specifying at least the query natural language; combining (e.g., 1110) the query language-agnostic vector with the query context vector, to produce a query context-supplemented vector; searching (e.g., 1112) an index that has a plurality of index entries arranged in a data structure (e.g., 204) to find at least one index entry that is determined to match the query context-supplemented vector; using (e.g., 1114) the at least one index entry to retrieve information regarding at least one respective target data item from a data store (e.g., 124); and providing (e.g., 1202) the information that is retrieved to the user.

Each index entry in the index is associated with a target data item. The index entry has a field that includes a target context-supplemented vector that is made up of a target language-agnostic vector and a target context vector. The target language-agnostic vector is generated by the machine-trained model and expresses a semantic content of the target data item that is independent of a natural language used to express the target data item. The target context vector expresses a target context associated with the target data item that depends on one or more target context parameters, the one or more target context parameters specifying at least a target language used to express the target data item.

The search operation identifies the at least one index entry by comparing the query context-supplemented vector with a plurality of target context-supplemented vectors in the index. Further, the search operation identifies the at least one index entry with fewer index interrogation operations by using query and target context vectors, compared to a search operation that does not use the query and target context vectors.

(C1) According to another aspect, some implementations of the technology described herein include another computer-implemented method (e.g., the process 1102 of FIG. 11), using one more computing devices (e.g., computing system 1402 of FIG. 14), for performing a lookup operation. The method includes: obtaining (e.g., 1104) a source data item specified by a user using a computing device (e.g., 106); converting (e.g., 1106) the source data item into an original source lookup key, wherein a set of different source data items map to the same original source lookup key; obtaining (e.g., 1108) a source distinguishing offset that further describes at least one aspect of the source data item, the source distinguishing offset depending on one or more source context parameters; combining (e.g., 1110) the original source lookup key with the source distinguishing offset, to produce a source offset-supplemented key; searching (e.g., 1112) an index that has a plurality of index entries arranged in a data structure (e.g., 204) to find at least one index entry that is determined to match the source offset-supplemented key; using (e.g., 1114) the at least one index entry to retrieve information regarding at least one respective target data item from a data store (e.g., 124); and providing (e.g., 1202) the information that is retrieved to the user. Each index entry in the index is associated with a target data item.

The index entry includes a field having a target offset-supplemented key that is made up of an original target lookup key and a target distinguishing offset, a set of different target data items mapping to the same original target lookup key. The target distinguishing offset describes at least one aspect of the target data item, the target distinguishing offset depending on one or more context parameters. The searching operation identifies the at least one index entry by comparing the source offset-supplemented key with a plurality of target offset-supplemented keys in the index.

In yet another aspect, some implementations of the technology described herein include a computing system (e.g., computing system 102, 1402) for performing a lookup operation. The computing system includes hardware logic circuitry (e.g., 1414) that is configured to perform any of the methods described herein (e.g., any individual method of the methods A1-13, B1, and C1).

In yet another aspect, some implementations of the technology described herein include a computer-readable storage medium (e.g., the computer-readable storage medium 1406) for storing computer-readable instructions (e.g., 1408). The computer-readable instructions, when executed by one or more hardware processors (e.g., 1404), perform any of the methods described herein (e.g., any individual method of the methods A1-13, B1, and C1).

More generally stated, any of the individual elements, aspects, and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1414 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for performing a lookup operation, comprising:
    obtaining a source data item specified by a user using a computing device, the source data item being expressed in a source natural language;
    using a machine-trained model to convert the source data item into a source language-agnostic vector, wherein plural source data items that express a same semantic content as the source data item map to the source language-agnostic vector;
    obtaining a source language vector that expresses a source context in which the user has specified the source data item, the source language vector depending on one or more source context parameters, including at least one source context parameter that describes a natural language that is used to describe the source data item;
    combining the source language-agnostic vector with the source language vector, to produce a source language-supplemented vector;

searching an index that has a plurality of index entries arranged in a data structure to find at least one index entry that is determined to match the source language-supplemented vector;

using said at least one index entry to retrieve information regarding at least one respective target data item from a data store; and providing the information that is retrieved to the user, each index entry in the index being associated with a target data item, the index entry including a field having a target language-supplemented vector that is made up of a target language-agnostic vector and a target language vector, the target language-agnostic vector being generated by the machine-trained model and expressing a semantic content of the target data item that is independent of a natural language used to express the target data item, and the target language vector expressing a target context associated with the target data item that depends on one or more target context parameters, including at least one target context parameter that describes a natural language that is used to describe the target data item, and said searching identifying said at least one index entry by comparing the source language-supplemented vector with a plurality of target language-supplemented vectors in the index, wherein said searching generates a similarity measure between the source language-supplemented vector and the target language-supplemented vector by:

forming a first product of the source language-agnostic vector and the target language-agnostic vector;

forming a second product of the source language vector and the target language vector;

forming a sum of the first product and the second product;

forming a third product of magnitudes of the source language-supplemented vector and the target language-supplemented vector; and forming a ratio of the sum and the third product.

2. The computer-implemented method of claim 1, wherein said searching identifies said at least one index entry using an approximate nearest neighbor search process, and wherein said searching identifies said at least one index entry using the nearest neighbor search process with fewer index interrogation operations by using source and target language vectors, compared to a search operation that does not use the source and target language vectors.

3. The computer-implemented method of claim 1, wherein said searching identifies said at least one index entry using an approximate nearest neighbor search process, and wherein said searching uses the source language vector to elevate a rank of a first target data item over a second target data item that both express a same semantic content as the source data item, the first target data item having a first-item target language vector that more closely matches the source language vector compared to a second-item language vector associated with the second target data item.

4. The computer-implemented method of claim 1, wherein said searching involves traversing the data structure of the index using an approximate nearest neighbor search process, and wherein said traversing the data structure is performed in a more direct manner compared to a search operation that does not use source and target language vectors.

5. The computer-implemented method of claim 1, wherein the source data item is a query submitted by the user, and the target data item is another query that matches the query submitted by the user, or an answer to the query.

6. The computer-implemented method of claim 1, wherein the source data item is a query, and the target data item is a content item that matches the query.

7. The computer-implemented method of claim 1, wherein the source language vector is also formed based on:

another source context parameter that describes a geographic region from which the user submits the source data item; or another source context parameter that describes behavior of the user in conducting one or more prior searches; or another source context parameter that describes a geographic region from which the user submits the source data item, and another source context parameter that describes behavior of the user in conducting one or more prior searches.

8. The computer-implemented method of claim 1, wherein said obtaining the source language vector includes:

identifying said one or more source context parameters that describe the source context; and using said one or more source context parameters to look up the source language vector in a vector data store that includes plural source language vectors associated with plural respective source contexts.

9. The computer-implemented method of claim 1, wherein said obtaining the source language vector includes:

identifying said one or more source context parameters that describe the source context; and using another machine-trained model to map said one or more source context parameters to the source language vector.

10. The computer-implemented method of claim 1, wherein the index provides target language vectors selected from a vector data store that stores pre-generated target language vectors associated with respective target contexts, and wherein at least some of the target language vectors in the target vector data store are manually chosen.

11. The computer-implemented method of claim 1, wherein the index provides target language vectors selected from a vector data store that stores pre-generated target language vectors associated with respective target contexts, and wherein at least some of the target language vectors in the vector data store are automatically chosen by a machine-training process based on item selection behavior exhibited by a plurality of users.

12. A computing system for performing a lookup operation, comprising:

hardware logic circuitry for performing operations, the hardware logic circuitry corresponding to: (a) one or more hardware processors that execute machine-readable instructions stored in a memory, or (b) one or more other hardware logic units that include a collection of logic gates, or (a) and (b), the operations including:

obtaining a source data item specified by a user using a computing device, the source data item being expressed in a source natural language;

using a machine-trained model to convert the source data item into a source language-agnostic vector, wherein plural source data items that express a same semantic content as the source data item map to the source language-agnostic vector;

obtaining a source language vector that expresses a source context in which the user has specified the source data item, the source language vector depending on one or more source context parameters, including at least one source context parameter that describes a natural language that is used to describe the source data item;
combining the source language-agnostic vector with the source language vector, to produce a source language-supplemented vector;
searching an index that has a plurality of index entries arranged in a data structure to find at least one index entry that is determined to match the source language-supplemented vector;
using said at least one index entry to retrieve information regarding at least one respective target data item from a data store; and
providing the information that is retrieved to the user,
each index entry in the index being associated with a target data item,
the index entry including a field having a target language-supplemented vector that is made up of a target language-agnostic vector and a target language vector, the target language-agnostic vector being generated by the machine-trained model and expressing a semantic content of the target data item that is independent of a natural language used to express the target data item, and the target language vector expressing a target context associated with the target data item that depends on one or more target context parameters, including at least one target context parameter that describes a natural language that is used to describe the target data item,
said searching identifying said at least one index entry by comparing the source language-supplemented vector with a plurality of target language-supplemented vectors in the index,
wherein said searching generates a similarity measure between the source language-supplemented vector and the target language-supplemented vector by:
forming a first product of the source language-agnostic vector and the target language-agnostic vector;
forming a second product of the source language vector and the target language vector;
forming a sum of the first product and the second product;
forming a third product of magnitudes of the source language-supplemented vector and the target language-supplemented vector; and
forming a ratio of the sum and the third product.

13. The computing system of claim 12, wherein said searching involves traversing the data structure of the index using an approximate nearest neighbor search process, and wherein said traversing the data structure is performed in a more direct manner compared to a search operation that does not use source and target language vectors.

14. The computing system of claim 12, wherein said one or more source context parameters also include:
another source context parameter that describes a geographic region from which the user submits the source data item; or
another source context parameter that describes behavior of the user in conducting one or more prior searches; or
another source context parameter that describes a geographic region from which the user submits the source data item, and another source context parameter that describes behavior of the user in conducting one or more prior searches.

15. The computing system of claim 12, wherein said obtaining the source language vector includes:
identifying said one or more source context parameters that describe the source context; and
using said one or more source context parameters to look up the source language vector in a vector data store that includes plural source language vectors associated with plural respective source contexts, or using another machine-trained model to map said one or more source context parameters to the source language vector, or using said one or more source context parameters to look up the source language vector in a vector data store that includes plural source language vectors associated with plural respective source contexts, and using another machine-trained model to map said one or more source context parameters to the source language vector.

16. The computing system of claim 12, wherein the index provides target language vectors selected from a vector data store that stores pre-generated target language vectors associated with respective target contexts, and wherein at least some of the target language vectors in the vector data store are automatically chosen by a machine-training process based on item selection behavior exhibited by a plurality of users.

17. A computer-readable storage medium for storing computer-readable instructions, the computer-readable instructions, when executed by one or more hardware processors, performing a method that comprises:
obtaining a query specified by a user using a computing device, the query being expressed in a query natural language;
using a machine-trained model to convert the query into a query language-agnostic vector, wherein plural queries that express a same semantic content as the query map to the query language-agnostic vector;
obtaining a query language vector that expresses a query context in which the user has specified the query, the query language vector depending on one or more query context parameters, said one or more query context parameters specifying at least the query natural language;
combining the query language-agnostic vector with the query language vector, to produce a query language-supplemented vector;
searching an index that has a plurality of index entries arranged in a data structure to find at least one index entry that is determined to match the query language-supplemented vector;
using said at least one index entry to retrieve information regarding at least one respective target data item from a data store; and
providing the information that is retrieved to the user,
each index entry in the index being associated with a target data item,
the index entry having a field including a target language-supplemented vector that is made up of a target language-agnostic vector and a target language vector, the target language-agnostic vector being generated by the machine-trained model and expressing a semantic content of the target data item that is independent of a natural language used to express the target data item, and the target language vector expressing a target context associated with the target data item that depends on one or more target context parameters, said one or more target context parameters specifying at least a target language used to express the target data item, said searching identifying said at least one index entry by comparing the query language-supplemented vector with a plurality of target language-supplemented vectors in the index,
wherein said searching generates a similarity measure between the query language-supplemented vector and the target language-supplemented vector by:
forming a first product of the query language-agnostic vector and the target language-agnostic vector;
forming a second product of the query language vector and the target language vector;
forming a sum of the first product and the second product;
forming a third product of magnitudes of the query language-supplemented vector and the target language-supplemented vector; and
forming a ratio of the sum and the third product.

* * * * *